United States Patent [19]

Pavkovich

[11] 4,149,249

[45] Apr. 10, 1979

[54] APPARATUS AND METHOD FOR RECONSTRUCTING DATA

[75] Inventor: John M. Pavkovich, Palo Alto, Calif.

[73] Assignee: Varian Associates, Inc., Palo Alto, Calif.

[21] Appl. No.: 760,492

[22] Filed: Jan. 19, 1977

Related U.S. Application Data

[63] Continuation-in-part of Ser. No. 643,896, Dec. 23, 1975.

[51] Int. Cl.² .................... G06F 15/42; G01N 23/00
[52] U.S. Cl. ............................. 364/414; 250/445 T
[58] Field of Search ............... 235/151, 151.1, 151.3, 235/181, 152, 156; 250/362, 363, 366, 369, 445 R, 445 T, 505, 446; 358/107, 139, 903; 364/413, 414, 415, 481, 514, 515, 576, 728, 819

[56] References Cited

U.S. PATENT DOCUMENTS

| | | | |
|---|---|---|---|
| 3,778,614 | 12/1973 | Hounsfield | 250/445 T X |
| 3,924,129 | 12/1975 | Le May | 250/445 T X |
| 3,937,963 | 3/1976 | Hounsfield | 250/445 T X |
| 3,973,128 | 8/1976 | LeMay | 250/445 T |
| 3,976,885 | 8/1976 | Brunnett et al. | 250/445 T |

Primary Examiner—Joseph F. Ruggiero

Attorney, Agent, or Firm—Stanley Z. Cole; Leon F. Herbert; Edward J. Radlo

[57] ABSTRACT

An apparatus and method for reconstructing data, a fan beam of radiation is passed through an object, which beam lies in the same quasi-plane as the object slice to be examined. Radiation not absorbed in or scattered by the object slice is recorded on oppositely situated detectors aligned with the source of radiation. Relative rotation is provided between the source-detector configuration and the object. Reconstruction means are coupled to the detector means, and may comprise a general purpose computer, a special purpose computer, and control logic for interfacing between said computers and controlling the respective functioning thereof for performing a convolution and back projection based upon non-absorbed and non-scattered radiation detected by said detector means, whereby the reconstruction means converts values of the non-absorbed and non-scattered radiation into values of absorbed radiation at each of an arbitrarily large number of points selected within the object slice. Display means are coupled to the reconstruction means for providing a visual or other display or representation of the quantities of radiation absorbed at the points considered in the object.

12 Claims, 7 Drawing Figures

O = CENTER OF ROTATION
S = RADIATION SOURCE
P = POINT OF INTEREST IN OBJECT
R = DISTANCE FROM AXIS OF ROTATION TO S
D = DISTANCE FROM O TO P
Z = DISTANCE FROM S TO P
   $= [R^2 + D^2 - 2RD \cos \theta]^{1/2}$

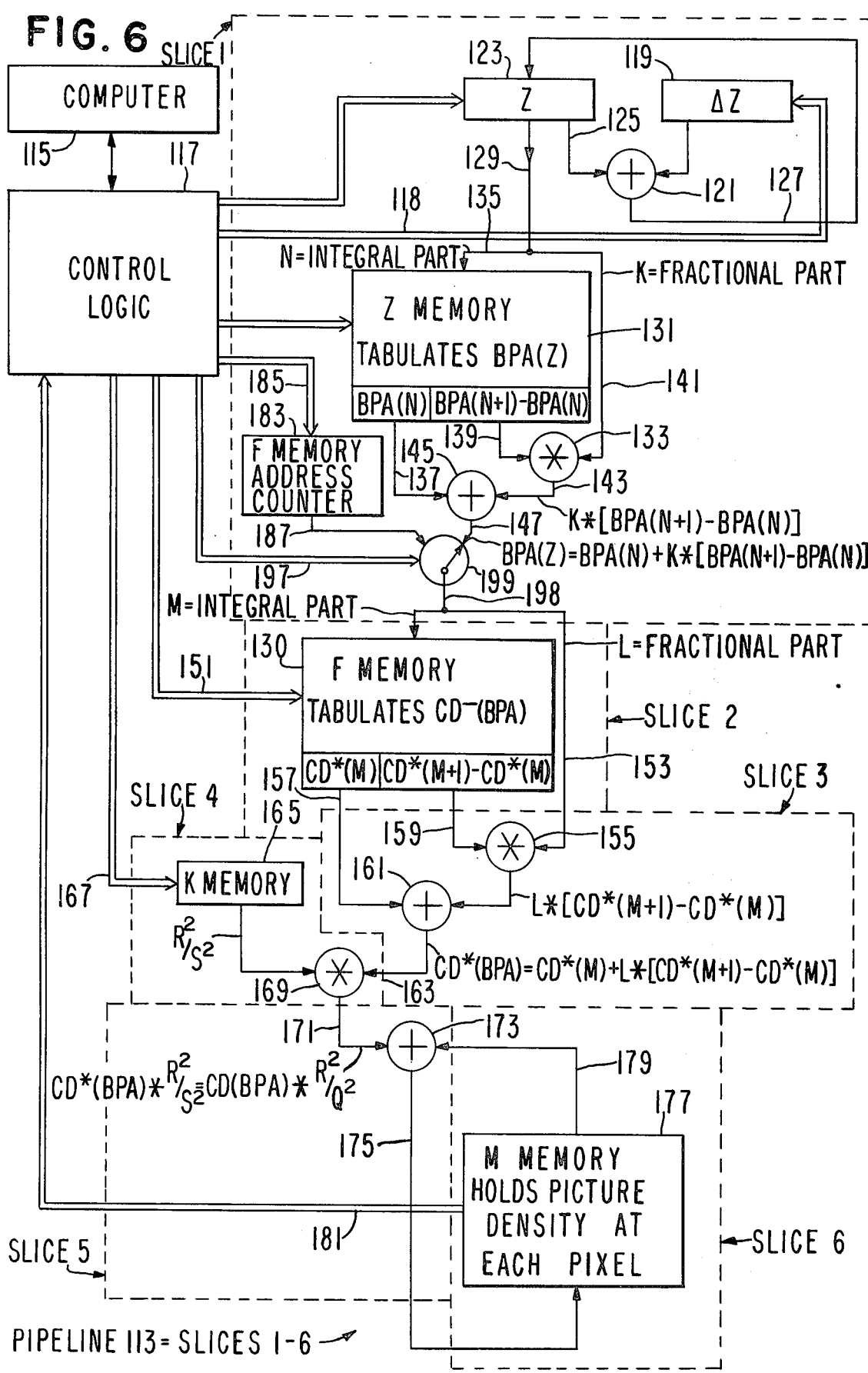

APPARATUS AND METHOD FOR RECONSTRUCTING DATA

BACKGROUND OF THE INVENTION

This application is a continuation-in-part of my co-pending application, Ser. No. 643,896, filed on Dec. 23, 1975 and entitled "Apparatus and Method for Reconstructing Data", which application is assigned to the same assignee as is the present application.

FIELD OF THE INVENTION

This invention relates to a method and apparatus for constructing a two-dimensional picture of an object slice from linear projections of radiation not absorbed or scattered by the object, useful in the fields of medical radiology, microscopy, and non-destructive testing. The branch of the invention employing x-rays for medical radiology is sometimes referred to as Computerized Tomography.

DESCRIPTION OF THE PRIOR ART

It is useful in many technologies to construct a two-dimensional pictorial representation from a series of linear data resulting from sensory projections taken through the quasi-plane within which lies the two-dimensional planar slice of the object that one wishes to reconstruct. For example, in the case of utilizing x-rays to provide a pictorial representation of the inside of the human body it is known to pass X or gamma radiation through the tissues of the body and measure the absorption of this radiation by the various tissues. the nature of the tissues may then be determined by the percentage extent of absorption in each tissue of the radiation, since different tissues are known to absorb differing amounts of radiation.

Passing a wall of radiation through an object and detecting the amount of absorption within the object by means of complementary-spaced detectors results in a three-dimensional object being projected onto a two-dimensional picture. This can result in the superimposition of information and resulting loss of said information. More sophisticated techniques must be devised if one wishes to examine a body with greater sensitivity to spatial variations in radiation absorption and fewer superimposition effects.

In a method known as general tomography a source of radiation and a photographic film are revolved along an elliptical or other path near the body in such a way that elements in one lane of the body remain substantially stationary. This technique is utilized to obtain relevant information along a two-dimensional planar slice of the body. This method has a disadvantage in that shadows of bodily tissues on planes of the body other than the desired planar slice appear as background information partially obscuring the information desired to be obtained from the cognizant slice.

In an attempt to obtain more accurate information, methods have been proposed whereby the radiation and detection of same all lie within the planar slice of the object to be examined. A two-dimensional reconstruction of the thin slice of the object is then performed, and repeated for each slice desired to be portrayed or diagnosed.

In A. M. Cormack, "Representations of a Function by Line Integrals with Some Radiological Applications", Journal of Applied Physics, Vol. 34, No. 9, pp. 2722-2727, (September 1963), (reference 1), the author used a collimated 7 millimeter diameter beam of cobalt 60 gamma rays and a collimated Geiger counter. About 10,000 counts were integrated for each 5 millimeter lateral displacement of the beam which passed through a phantom 5 centimeters thick and 20 centimeters in diameter comprising concentric cylinders of aluminum, aluminum alloy and wood. Because of symmetry of the phantom, measurements were made at only one angle. The resulting calculated absorption coefficients were accurate to plus or minus 1.5 percent.

In October, 1964, the same author in "Representations of a Function by Line Integrals with Some Radiological Applications. II", Journal of Applied Physics, Vol. 35, No. 10, pp 2908-2913, (2), separated the two-dimensional problem into a set of one-dimensional integral equations of a function with solely radial variation. The measurments were expanded in a sine series with coefficients identical to those of the radial density function when expanded in a limited series of Zernicke polynomials. This method is mathematically equivalent to a Fourier transform technique but differs in practical application, such as significance of artifacts introduced by interpolation. Cormack used a collimated 5 × 5 millimeter beam of cobalt 60 gamma rays and a collimated Geiger counter. About 20,000 counts were integrated for each beam position. The beam was displaced laterally by 5 millimeter intervals to form a parallel set of 19 lines and the set was repeated at 7.5 degree intervals for 25 separate angles. The phantom was 2.5 centimeters thick, 20 centimeters in diameter, comprising an aluminum disc at the center, an aluminum ring at the periphery, an aluminum disc off axis, and the remainder Lucite. From 475 independent measurements, 243 constants were determined and used to synthesize the absorption distribution. The resulting accuracy of calculated absorption values was good on average but ringing was introduced by the sharp changes in density Cormack's method is capable in theory of yielding a unique principal solution, but is nevertheless complicated, has limited practical application and liable to error in its practically feasible forms.

D. J. DeRosier and A. Klug in "Reconstruction of Three-dimensional structures from Electron Micrographs", Nature, Vol. 217, pp. 130-134 (Jan. 13, 1968), (3), used Fourier transformation of two dimensional electron transmission images (electron micrographs) at a number of angles (30 for nonsymmetric objects) to produce a series of sections representing the object in three dimensions. Resolution of the final three-dimensional Fourier density map was 30 Angstroms, for a 250 Angstrom T4 bacteriophage tail.

R. G. Hart, "Electron Microscopy of Unstained Biological Material: The Polytropic Montage", Science, Vol. 159, pp. 1464-1467 (March, 1968), (4), used 12 electron micrographs taken at different angles, a flying spot scanner, cathode ray tube and CDC-3600 computer (Control Data Corporation, Minneapolis, Minnesota) with 48 bit, 32 K word core to produce a section display by digital superposition. Resolution approached 'Angstroms.

D. E. Kuhl, J. Hale and W. L. Eaton, "Transmission Scanning: A Useful Adjunct to Conventional Emission Scanning for Accurately Keying Isotope Deposition to Radiographic Anatomy", Radiology, Vol. 87, pp. 278-284, in August, 1966, (5), (see FIG. 10) installed a collimated radioactive source (100 millicuries of 60 keV Americium-241) opposite one detector of a scanner which had two opposed detectors. (K) also suggested that a 1licurie 30 keV Iodine-125 source could be installed opposite each of the detectors of a two detector system.) A 6.3 millimeter hole was drilled in the collimator of the opposing detector. The opposed detectors were translated together to scan the patient at each of a number of angles usually 15 degrees apart (see Kuhl and Edwards, "Cylindrical and Section Radioisotope Scanning of Liver and Brain", Radiology, Vol. 83, 926, November, 1964, at page 932) (6). A CRT (cathode ray tube) beam was swept to form a narrow illuminated line corresponding to the orientation and position of the 6.3 millimeter gamma beam through the patient and as the scan proceeded the brightness of the line on the CRT was varied according to the count rate in the detector; a transverse section image was thus built up on a film viewing the CRT. Kuhl found the transverse section transmission scan to be especially useful for an anatomic orientation of a simultaneous transverse section emission scan of the human thorax and mediastinum.

At the June, 1966 meeting of the Society of Nuclear Medicine in Philadelphia, Dr. Kuhl (D. E. Kuhl and R. Q. Edwards, Abstract A-5 "Reorganizing Transverse Section Scan Data as a Rectilinear Matrix Using Digital Processing", Journal of Nuclear Medicine, Vol. 7, P. 332, (June, 1966) (7), described the use of digital processing of his transverse section scan data to produce a rectilinear matrix image superior to the images obtained with the above method of film exposure summation of count rate modulated CRT lines. The scan data from each detector was stored on magnetic tape, comprising a series of scans at 24 different angles 7.5 degrees apart around the patient. One hundred eighty-one thousand operations were performed in 12 minutes on this data to produce a transverse section image matrix of 10,000 elements.

The process is described in more detail in D. E. Kuhl and R. Q. Edwards, "Reorganizing Data from Transverse Section Scans of the Brain Using Digital Processing", Radiology, Vol. 91, p. 975 (November, 1968) (8). The matrix comprised a 100 by 100 array of 2.5 millimeter by 2.5 millimeter elements. For each picture element the counts recorded on the scan line through the element at each of the 24 scan angles were extracted by programmed search from drum storage, summed, divided by 24 and stored on tape, after which they could be called sequentially to produce a CRT raster scan.

R. A. Crowther, D. J. DeRosier, and A. Klug, in "The Reconstruction of a Three Dimensional Structure from Projections and Its Application to Electron Microscopy", Proceedings of the Royal Society of London, 317A, 319 (1970), (9), developed a formal solution of the problem of reconstructing three-dimensional absorption distributions from two-dimensional electron micrograph projections, using Fourier transformation. They considered a series of 5 degree tilts from +45 degrees to −45 degrees and found that at least $\pi D/d$ views are required to reconstruct a body of diameter D to a resolution of d. p. 332.

M. Goitein, in "Three Dimensional Density Reconstruction from a Series of Two-Dimensional Projections", Nuclear Instruments and Methods 101, 509 (1972), (10), shows that standard matrix inversion techniques for two dimensional reconstructions require too much storage space. He states that a 50K word memory is required for an inversion of a 225×225 matrix for a 15×15 elements object grid and that with use of overflow memory the execution time increases as the sixth power of the number of cells along the edge of the object grid, p. 511. He proposes an iterative relaxation procedure since an "exact solution" is not computationally accessable for a typical object grid such as 100×100 elements. This technique involves adjusting the density of any cell to fit all measurements which involve that cell, "fit" being on the basis of least-squares minimization. He used the Cormack (1964) phantom design as a model, simulated it on a computer, "measured" absorption with a scan of 51 transversely separated lines repeated at 40 uniformly spaced angles, introduced 1% random error in the measurements and computed the absorption distribution in a transverse section view on a 30×30 grid using 15 iterations. He also computed absorption distributions in transverse section view using the original absorption data recorded by Cormack (1964) as well as data furnished by others from alpha beam and X-ray beam transmission measurements.

D. Kuhl, R. Q. Edwards, A. R. Ricci and M. Reivich, in "Quantitative Section Scanning Using Orthogonal Tangent Correction", Abstract, Journal of Nuclear Medicine Vol. 13, p. 447 (June, 1972), (11), describe an iterative computation method combining the data from a scan at one angle with the data from a scan at 90 degrees to this angle, and repeating this computation process for a multitude of angles. An iterative correction is continued through all angles, requiring 10 minutes with a Varian 16 bit 8K word core computer (Varian Data Machines, Irvine, California).

All of these methods suffer from certain deficiencies. The errors inherent in such prior art techniques are not easily ascertainable. The time to gather the data is slow; in the case of X-ray diagnosis, this increases the time the patient must be strapped in an uncomfortable position and limits the throughput, i.e., total patient handling capacity, of the machine. It also means that for slices of body regions such as the abdominal cavity, the patient's normal breathing produced motion in the object during the taking of measurements and consequent blurring of the output picture, which can mask, for example, the presence of tumors. The time required to reduce the data to picture form is lengthy, typically on the order of a quarter of an hour. Spatial resolution of the output picture is often relatively poor.

D. Boyd, J. Coonrod, J. Dehnert, D. Chu, C. Lim, B. MacDonald, and V. Perez-Mendez, "A High Pressure Xenon Proportional Chamber for X-Ray Laminographic Reconstruction Using Fan Beam Geometry," IEEE Transactions on Nuclear Science, Vol. NS-21, No. 1 (Feb. 1974) (12), describe, at P. 185, a reconstruction method for a fan beam source which employs a convolution method of data reconstruction. This use of a fan beam can result in a reduction in data-gathering time, and a more efficient utilization of radiation flux. However, the fan beam rays are first reordered into parallel beam rays, then a known parallel ray convolution method is employed. This step of first reordering the data introduces a delay. An additional problem with this method is that normal optimization of design criteria in most applications requires that the angle between individual rays of the fan beam be less than the angle of arc between pulses of the source. Thus, there is no one-to-one matchup between fam beam rays and parallel beam rays. As a result, approximations must be made during the reordering step, causing a diminution in resolution in the cutout picture. Even in the case where there is a one-to-one relationship between fan beam rays and parallel beam rays, the distances between the resultant parallel beam rays will be unequal. Therefore, another set of resolution-diminishing approximations must be made. Another problem with reordering is that reordering forces one to fix irrevocably the number of pulses per revolution of the source. This results in a loss of flexibility because, for example, the wider the object being pictured, the smaller the arcuate angle between pulsing required for the same resolution. If one does not reorder, one can design into the machine convenient means whereby the operator may adjust the arcuate angle between pulsing depending upon the object size.

No prior art method combines the use of a fan beam source and the application of a convolution method of data reconstruction with no intervening reordering of the detected projection profiles over each other. No prior art method is capable of providing an exact reconstruction of a two-dimensional picture from a series of one-dimensional projections when the superior fan beam source is employed.

OBJECTS OF THE INVENTION

It is therefore a primary object of the instant invention to provide an improved method and apparatus for reconstructing two-dimensional pictures from a succession of linear projections for use in computerized tomography, electron microscopy, and other fields of technology, and for creating three-dimensional pictures by piecing together a series of two-dimensional pictures.

It is a further object of the present invention to provide means for obtaining a two-dimensional X-ray pictorial representation of a slice of a human or other body in which the body is exposed to radiation for a shorter time than in the prior art.

It is another object of the instant invention to provide for more accurate two-dimensional reconstruction of an image based upon a succession of one-dimensional data obtained by projecting radiation through the object slice in its quasi-plane.

It is still another object of the instant invention to provide an improved means for reconstructing a two-dimensional pictorial representation of a planar slice of an object by passing radiation through the object, in which the errors inherent in the pictorial reconstruction are readily ascertainable.

It is another object of the instant invention to provide an improved apparatus and method for reconstructing a two-dimensional picture from a series of one-dimensional projection profiles in which the data acquisition and data reconstruction times are both substantially reduced over the prior art for the same degree of resolution.

It is another object of the instant invention to project a fan beam of radiation through an object slice in its quasi-plane and reconstruct a picture of the object by means of a convolution method of data reconstruction which operates on the detected projection profiles produced by the fan beams with no intervening reordering of fan beam rays into a different set of rays.

It is yet another object of the instant invention to provide an exact reconstruction replica of a two dimensional object slice when a fan beam of radiation is passed through the object at different angles creating a set of one dimensional measured projections.

It is another object of the instant invention to graphically picture a reconstruction of a two dimensional object based on a set of one-dimensional projection values corresponding to amounts of detected radiation non-absorbed and non-scattered by the object, in which the resolution is improved over the prior art for the same data acquisition and reconstruction times.

SUMMARY OF INVENTION

Briefly and in accordance with above objects the present invention is concerned with a method and apparatus for constructing a two-dimensional picture of an object slice from linear projections obtained by passing radiation in quasi-planar form through the quasi-plane of the object slice at various angles and measuring amounts of radiation not absorbed or scattered by said object slice. By quasi-plane is meant plane-like with small but finite thickness. This method and apparatus can be used in the fields of medical radiology, microscopy, non-destructive testing, and other fields as well.

A fan beam of radiation (which may be light, heat, sound, transmissive ultrasound, electro-magnetic radiation, X-rays, gamma rays, or sub-atomic particles such as electrons, protons, neutrons, or heavy ions, or any other form of transmissive radiation) is passed through an object slice lying in a quasi-plane. The quasi-plane has a small thickness, in the case of X-ray diagnosis, typically but not necessarily between about 1 millimeter and 15 millimeters. The entire three-dimensional object can be portrayed by picturing a series of side-by-side slices each 1 to 15 mm thick. The whole series can be mapped and pictured simultaneously.

The object absorbs some of the radiation, scatters some additional radiation, and the rest is detected by an elongate detector or detectors situated opposite the source of fan radiation, and aligned therewith, lying in the same plane as the source of radiation and the object slice. The angular distance between each individual detection point is constant. Thus the detector bank is preferably arcuate in geometry, and may comprise an entire circle or ellipse; or the detector bank lies in a straight line with each individual detection point oriented toward the source. A compensator may be positioned around the object to reduce the variation in intensity of radiation reaching the detector(s). Data may be extracted from the detector(s) serially or in parallel, continuously or in pulses. In the case of gamma or X-radiation, each individual detector element may comprise a scintillator of gas, liquid, or solid employing a crystalline substance such as sodium iodide and a photomultiplier or photodiode. Alternatively, it may comprise an ionization chamber filled with a high atomic numbered element such as xenon in gas, liquid, or solid phase, with or without a lower atomic numbered element such as argon in similar form as the xenon to capture K-emission X-rays. Alternatively, the detector may be a semiconductor such as high purity germanium or cadmium telluride or mercuric iodide, or it may be an image intensifier. The detector may operate in current integration mode or it may count individual gamma-ray or X-ray photons. The detector may comprise a scintillation screen-film combination moved perpendicular to the fan beam to record successive projection profiles at successive source angles, with a flying spot scanner extracting the data from the developed film.

The radiation beam and the detectors may be continuous but are usually discrete. In either case, the resultant detected radiation may be fed into a computer for conversion into a two-dimensional pictorial representation on a graphical display device such as a cathode ray tube (CRT) or a printed sheet of paper capable of illustrating densities or contours. If a digital computer is employed with a detector providing analog output, the information is first processed by an analog-to-digital converter. If an analog computer is employed with a detector providing digital output, the information is first processed by a digital-to-analog converter. In either case, the computer calculates the degree of absorption for each cell in a mesh or grid superimposed upon the object slice portrayed, and this data is then processed and converted into an analog or digital two-dimensional pictorial form.

In the case of using radiation to diagnose human and other animal bodies, it is possible to distinguish and vividly portray aneurysms, hemorrhages, tumors, abnormal cavities, blood clots, enlarged organs, and abnormalities in ventricles (for example) since it is known that different tissues of the body absorb differing amounts of radiation.

The instant invention is the first method and apparatus which uses a convolution reconstruction method on fan beam rays with no prior reordering of the fan beam rays into a new set of rays.

A "convolution process" of x, c(x), according to the mathematical literature, is any integral or summation function of the form:

$$c(x) = \int f(x - x')g(x')dx' \text{ or}$$
$$c(x) = \sum_n f(x - x_n)g(x_n)$$

By "convolution method" is meant any method which employs such a convolution process.

The convolution method is much faster and provides equal or better resolution for the same amount of radiation than iterative methods used in the prior art. See "The Fourier Reconstruction of a Head Section", by L. A. Shepp and B. F. Logan, Bell Laboratories, Murray Hill, New Jersey, July 1974, (13), pp. 5,7, in which a convolution method for parallel geometry (14), is favorably compared with an iterative method of successive approximations. The instant invention accentuates this favorability because it uses a direct convolution method based upon polar geometry. No wasteful and error producing prior reordering of the rays into parallel rays is required to take advantage of the superior properties of fan beams.

The instant invention is also capable of showing the relationship between the measurements taken and the errors inherent in them, since the discrete embodiment is really a special case of the continuous embodiment, and one can gauge the effect of each simplifying approximation in turn.

The advantage to the fan beam is that it permits a faster data gathering than with a parallel beam source produced by translating a source and detector, and one can obtain a large number of measurements without moving the source, thus reducing the effects of mechanical vibrations which can impair accuracy. In the case of X-radiation applied to the body of a human or other animal, the patient is forced to lie still for a much shorter period of time and more patients can be processed by the machine in a given amount of time. Significantly, since all the data required for a cross-sectional scan can be acquired in the order of one second (one to two orders of magnitude faster than existing systems) it is now possible for the first time to obtain accurate pictures of areas of the body such as the abdominal cavity, without requiring extensive periods of breath-holding by the patient and with less motion artifact due to peristalsis and other organ motion. The source-detector array is typically rotated about the object slice in a circular path comprising 360 degrees. Alternatively, the object may rotate within a stationary source-detector assembly. Other configurations are also possible and are described below in the Detailed Description of the Preferred Embodiment. The source may be rotated continuously or step-wise in small angular steps. In either case, the radiation may emanate from the source continuously (for example, in the case where the source is radioactive), or in the form of periodic pulses or bursts. The detected data is convolved and back-projected without the necessity for first reordering the data into a new set of rays, for example, a set of parallel rays, as in prior art fan beam systems. By "back-projection" is meant the process of converting the convolved projection profile data associated with the detectors into values of absorbed density at an arbitrary number of points P preselected throughout the object slice under examination.

The instant invention encompasses the first exact reconstruction of a two-dimensional picture of an object slice from a series of one-dimensional projections of radiation non-absorbed by the slice when the superior fan beam source is employed. This means that the accuracy and resolution of the output picture are good even when data gathering and data reconstructing times are small. Thus, the fan beam approach is strengthened as a viable tool of scientific inquiry.

In addition, since an exact reconstruction is achieved, (limited only by imperfections in the instrumentation employed and intentionally introduced approximating variations to the general case), it is possible to more directly perceive the relationship between an introduced approximation and the quality and speed of the output response. Thus, a more precise control over the resolution/speed tradeoff is obtained compared with the known prior art.

BRIEF DESCRIPTION OF THE DRAWINGS

These and other more detailed and specific objects and features of the instant invention are more fully disclosed in the following specification, reference being had to the accompanying drawings in which:

FIG. 6 is a schematic block diagram illustrating operation in a back projection mode for a preferred form of data reconstruction system utilizable with the present invention.

DETAILED DESCRIPTION OF THE PREFERRED EMBODIMENT

Figure 1:
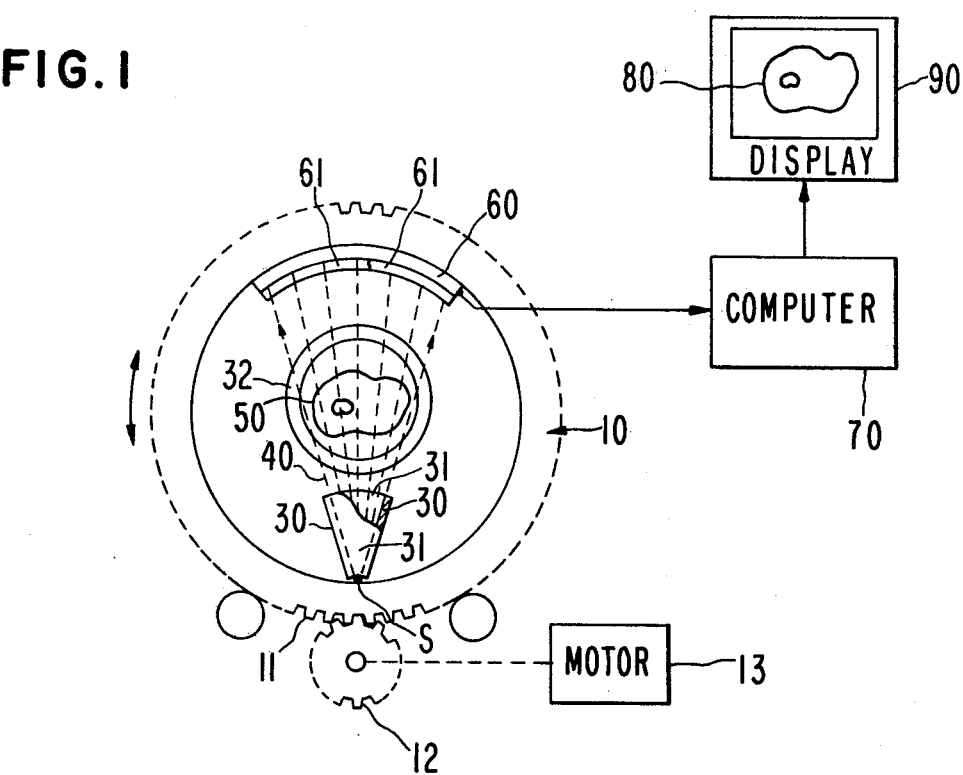
FIG. 1 is a partially schematic, partially block diagram of the embodiment of the system of the instant invention in which the data acquisition phase is continuous.

FIG. 1 shows a schematic and block diagram of the exact embodiment of the instant invention, i.e., when the data gathering is performed continuously. A source S of radiation, object slice 50, and a continuous detector 60 are lying in the same quasi-plane, which has a finite but small thickness, typically on the order of a few millimeters in the case of computerized tomography. Source S and continuous detector 60 are aligned and are preferably constructed so as to be always opposite each other; for example, they are each fixedly mounted on gantry 10 which rotates in a circular path around object slice 50. Alternatively, the object may rotate within a motionless source-detector assembly. Alternatively, one 360 degree continuous detector could be motionlessly mounted with just the source rotating. Or, a plurality of sources may be employed each over a portion of the circle; or else, one 360 degree continuous source could be employed with energization of only one point of said source at any given time, said point traversing the entire 360 degree arc over time.

The rotational force may be provided by a motor 13 which transmits energy to gantry gears 11 by means of drive gear 12. Continuous detector 60 preferably follows source S oppostie thereto, and is preferably arcuate in shape. When arcuate, it is geometry is preferably such that each point on the detector is equidistant from the source S.

Source S may be any type of radiation such as an electron beam in the case of electron microscopy or X or gamma radiation for examining a human, or other body. In the case where exact data reconstruction is desired (see equation 33, infra.) the source is energized continously throughout a complete 360 degree traversal of its circular path. Otherwise the source may pulse. In the case of X-radiation, detector 60 is typically a scintillator fabricated of a crystalline material such as sodium iodide plus a photomultiplier or photodiode; or it may comprise an ionization chamber filled with a substance such as xenon, or a mixture of substances such as xenon and argon, in gas, liquid, or solid phase; or it may comprise an emulsive film.

Collimators 30 shape the beam of radiation emanating from source S into the shape of a fan, at least as wide as object 50. Collimators 31 (parallel to the plane of the paper in FIG. 1) are spaced one beside the other to shape the fan into a thin quasi-planar beam, which does not necessarily have to be of uniform thickness; for example, if a point source of radiation is used, the beam will fan in a vertical as well as a horizontal direction. Detector collimators 61 serve to minimize the effects of Compton scatter from planes other than the imaging quasi-plane. Collimators 30, 31 and 61 are typically fabricated of lead, but may be made from any material which absorbs the radiation in unwanted directions. In the case X-ray diagnosis the thickness of the fan, as defined by collimators 31, is typically between 1mm and 15mm at the middle of the object. The arc that is cut by the fan is sufficiently large to cover the entire object slice.

Compensator 32, which may be a bag filled with water or plastic, may optionally be positioned enshrouding object 50 for the purposes of attenuating certain fan beam ray intensities and thereby reducing the range of intensities over which detector 60 must be responsive. The compensator may be fixedly mounted on gantry 10 so as to rotate therewith, or it may be mounted fixedly with respect to object 50.

As the source-detector array undergoes relative rotation with respect to the object (continuously where exact reconstruction is desired) over a time of approximately one to 15 seconds, readings of non-absorbed and non scattered radiation are time-continuously measured along detector 60. The data acquisition is preferably completed during one relative revolution (i.e., 360 degrees) of the system. Data from the detector may first be smoothed, is convolved with other data in a way which will be described below, may be smoothed again, and is then stored in computer 70 which, is analog, may comprise an analog store such as an acoustic wave or video disc. if digital, the computer is preferably a high-speed computer. The data is later back-projected with other data to produce an output picture 80 which is a replica of object 50.

The output picture is portrayed on a visual display device 90 such as a CRT (cathode ray tube) or an electrostatic output terminal which is capable of showing density of the object being portrayed as depth, contour, shadings, or color. A photograph or other hard copy of the CRT image may then be taken.

A series of two-dimensional pictures may be obtained by either taking a succession of pictures as above, or else by fabricating an array comprising a plurality of source-detector configurations spaced beside each other e.g., mounted side-by-side on gantry 10. In either case, the output may be portrayed as three-dimensional picture, for example, by portraying each output element as a shaded or colored translucent ball or cube. Alternatively, a series of transparent light panels may be used for a three-dimensional display.

Figure 2:
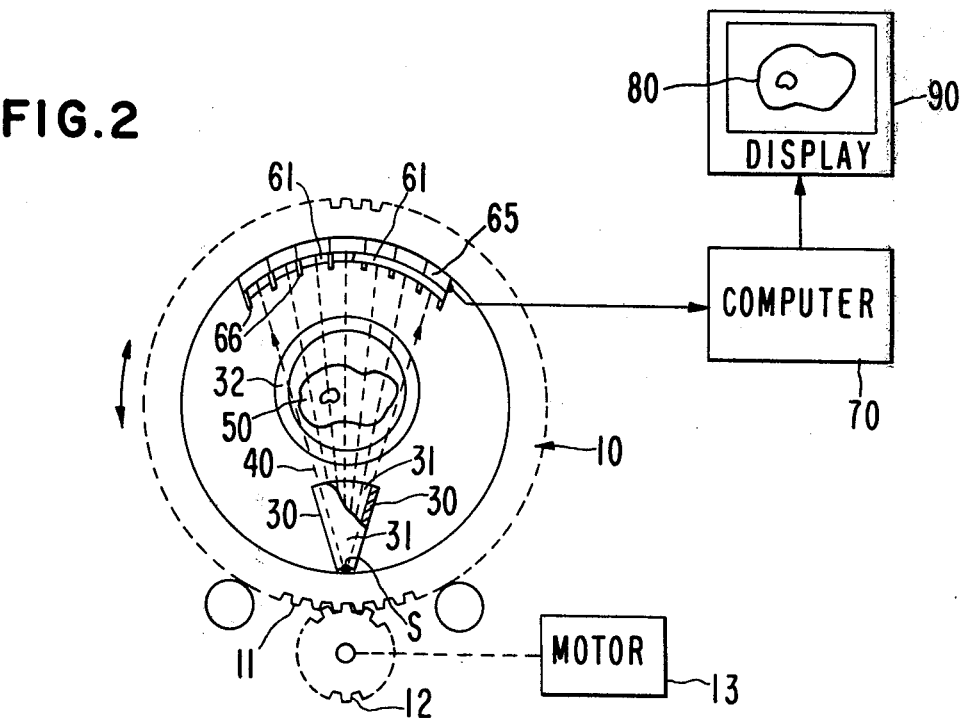
FIG. 2 is a partially schematic, partially block diagram of the embodiment of the instant invention in which the data acquisition phase is discrete.

FIG. 2 is similar to FIG. 1; the only difference is that continuous detector 60 has been replaced by an array or bank of discrete detectors 65, and grid 66 has been added. In cases where the two figures are identical, the description employed above in connection with FIG. 1 applies with equal force to FIG. 2, which illustrates the discrete embodiment of the invention, a special case of the continuous embodiment. The radiation emanating from source S may be a continuous fan or a discrete set of pencil beams (formed, e.g., by a set of collimators) with at least one beam per detector. Discrete detectors 65 typically number 300, although other values may be chosen.

The detector bank is positioned in such a way that the angular distance between detector elements is constant. For example, the bank is arcuate in geometry, or the bank is in a straight line (because easier to build) with each individual detector element aligned with a straight line drawn from the detector element to the source. A grid 66 fabricated of an element such as lead may be associated with each detector element 65 and aligned therewith to minimize the effects of Compton scatter lying in the same quasi-plane as the object slice. This grid is virtually essential when the radiation employed is X-radiation. This grid may optionally be used in the continuous case as well, i.e., where it is anticipated that Compton scatter in the same quasi-plane as the object slice will be a problem. In that application the grid may be made to oscillate or otherwise continuously move with respect to detector 60 so that grid lines do not appear on the output picture.

In the preferred embodiment, a source-detector array is rotated with gantry 10 in a circular path. Periodically (typically, during 360 short moments in time per rotation, on the order of two milliseconds each), radiation is pulsed from the source, absorption values are measured by the detectors 65, are digitalized, smoothed and fed into a working store within computer 70. Controls are built into the machine so that pulse duration and arcuate angle between pulsing can be quickly adjusted by the operator. These can also be employed in the continuous embodiment where exact data reconstruction is not required.

The data is then processed to yield absorption densities for a preselected plurality of points within object 50 and this recontructed set of densities is portrayed as output picture 80. The computer may be either hardwired, firmwared (microprogrammed or PROM-fused), or software programmed (or any combination of the above) to perform the requisite functions, which is true in the continuous embodiment as well.

In one embodiment for use with patients in medical radiology, the apparatus parameters could be as follows:

| | |
|---|---|
| X-ray tube voltage | 120 k V d.c. |
| X-ray tube average current | 250 mA |
| X-ray tube average power | 30 kW |
| X-ray exposure period per object slice | 4 seconds |
| Gantry rotation speed | 0.25 rps |
| Number of X-ray pulses per object slice | 360 |
| Exposure to surface of object | 8 rads |
| X-ray tube pulse current | 1000 mA |
| X-ray pulse duration | 2.8 millisec |
| Interpulse duration | 8.3 millisec |
| Distance from axis to source | 80 cm |
| Distance from source to detector | 160 cm |
| Maximum object slice dimension | 40 cm |
| Fan beam angular spread | 29 degrees |
| Fan beam thickness at middle of object | 8 mm |
| Fan ray interval at middle of object | 1.5 mm |
| Number of fan rays across maximum object slice | 267 |
| Nominal number of detector elements | 300 |
| Fan ray angular interval | 0.109 degrees |
| Source rotation interval per pulse | 1 degree |
| Interval between source pulses at 40 cm diameter object periphery | 3.5 mm |
| X-ray photons per pulse per detector element without object | $2.2 \times 10^8$ |
| Primary photon transmission through 40 cm water | 1/2000 |
| X-ray photons per pulse per detector element through object | $1.1 \times 10^5$ |
| Quantum statistical fluctuation per measurement | 0.33% rms |
| Statistical error in total of 360 measurements through one 1.5 mm × 1.5 mm cell of object slice | 0.6% rms |
| Number of reconstruction points in 40 cm diameter image | 40,000 |
| Spacing between reconstruction points in 40 cm diameter image | 1.8 mm |

If the fan rays were reordered into new set of parallel rays, bundles of 9 rays extending over successive 1 degree intervals of the fan would be reordered to successive source angular positions 1 degree apart to obtain pseudoparallel rays. The central rays of these 9-ray bundles would be parallel but their spacing would vary from 1.5 mm to 1.45 mm, an error 3%, depending on whether they came from the center or the edge of the fan beam, due to the source moving on a circle rather than a straight line.

The spacing of individual rays of the fan beam to individual detector eleemnts is 1.5 mm at the middle of the object. The spacing of the central axes of successively pulsed fan beams is 3.5 mm at the periphery of a 40 cm diameter object slice. Better resolution would be obtained for this relatively large size object if 720 pulses at 0.5 degree intervals of gantry rotation were employed, making the spacing of central rays at the object periphery comparable to the spacing of rays within the fan, thereby obtaining more uniform resolution in all directions. The pulse duration would then be 1.4 millisecond and the interpulse duration would be 4.1 millisecond for 4 seconds X-ray exposure per object slice, requiring faster data extraction from the detector elements and twice the number of profile convolution and back-projection computations. Thus, the selection of 360 pulses at 1 degree intervals with a detector of nominal 300 elements represents a practical choice for objects ranging in size from a few cm to 40 cm in diameter.

Let us now examine the method of data reconstruction for both the continuous and discrete case Radon's formula for the density at a point P is $$D(P) = -\frac{1}{\pi} \int_0^\infty dr \frac{1}{r} \frac{d\bar{f}(r)}{dr}$$

where r is measured from the point P and f(r) is the average of all line integrals of the density over lines passing a distance r from the point P. J. Radon, Ueber die Bestimmung von Funktionen durch ihre integralwerte laengs gewisser Mannigfaltigkeiten (on the determination of functions from their integrals along certain manifolds), Berichte Saechsische Akademie der Wissenschaften (Leipzig), Mathematische-Physische Klasse 69, 262–277 (Germany 1917). In this use D(P) represents the extent or density of radiation absorbed at the point P.

Figure 3:
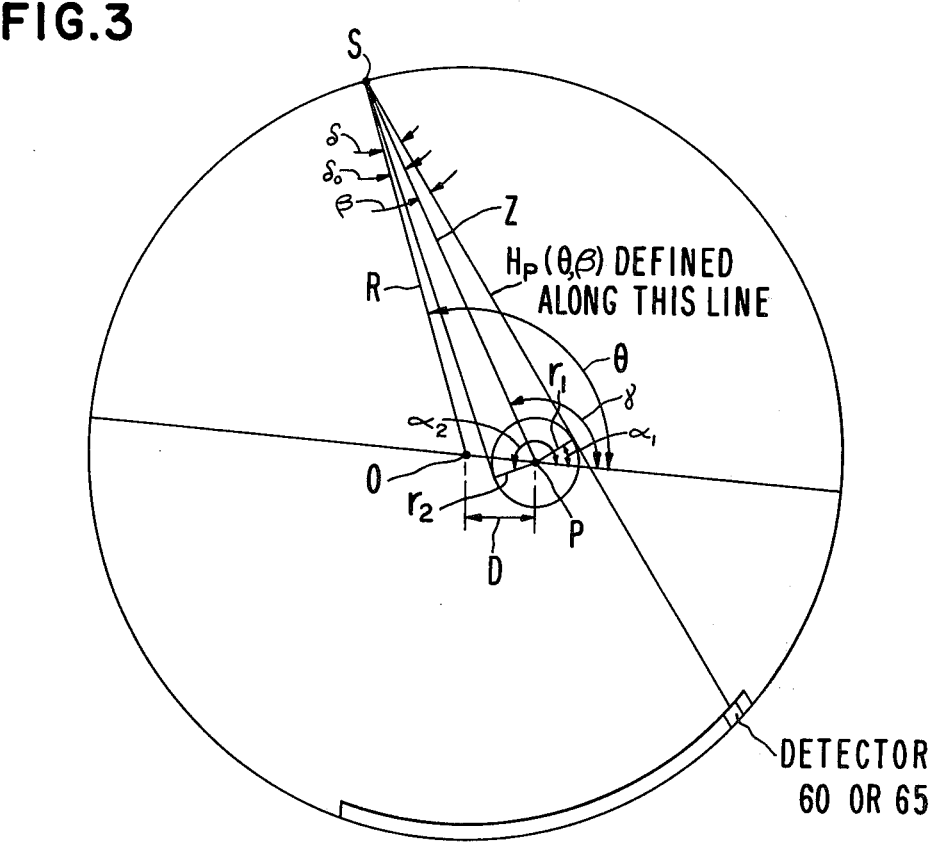
FIG. 3 is a geometrical representation of a preferred method of data acquistion and reconstruction in the instant invention.

Consider the diagram shown in FIG. 3. Define a measurement $H_P(\theta,\beta)$ as the integral (or measurement) of absorbed radiation along a line defined by the angles $\theta$ and $\beta$ and starting at the source point S. In other words, $H = \int D dx$ where dx is the incremental distance along the cognizant line. The subscript P denotes the fact that $\beta$ is measured from the line drawn from the source S to the point of interest P. If we define I to be the measurement of resulting radiation reaching detector(s) 60 or 65, and $I_o$ to be the radiation which would reach the detector(s) in the absence of any object, such as object 50, which would attenuate any of the radiation as it leaves the source, then we know from basic physical laws that $I = I_o e^{-\int D dx} = I_o e^{-H}$ In other words, $H = \ln I_o - \ln I = -\ln(I/I_o)$.

When the machine is initially calibrated, $I_o$ is chosen so as to be big enough to provide satistically adequate information (e.g., at least $10^3$ X-ray or gamma-ray photons per pulse at each detector element) but not so big as to harm the patient by means of an overdose of radiation in the case where the apparatus is employed for X-ray diagnosis of a patient's body (less than 50 rads of X-ray or gamma-ray dose total for all pulses).

Using Radon's formula we can write $$D(P) = -\frac{1}{\pi} \int_0^\infty dr_1 \frac{1}{r_1} \frac{dr}{dr_1} \left\{ \frac{1}{2\pi} \int_0^{2\pi} d\alpha_1 H_p(\theta,\beta) \right\} \quad (3)$$

We must now change the variables of integration from $dr_1 d\alpha_1$ to $d\theta d\beta$. Now $$dr_1 d\alpha_1 = J_1 d\beta d\theta$$

where $J_1$, the Jacobian, is given by $$J_1 = \begin{vmatrix} \frac{\delta r_1}{\delta \beta} & \frac{\delta r_1}{\delta \theta} \\ \frac{\delta \alpha_1}{\delta \beta} & \frac{\delta \alpha_1}{\delta \theta} \end{vmatrix} \quad (4)$$

The coordinates defining the transformation are as follows:
$$r_1 = Z \sin \beta \quad (5)$$

$$\alpha_1 = \beta - \pi/2 + \gamma \quad (6)$$
where $$\delta = \tan^{-1} \frac{R \sin \theta}{R \cos \theta - D} \quad \begin{array}{l} 0 \leq \theta \leq \pi \\ 0 \leq \gamma \leq \pi \end{array} \quad (7)$$

$$\delta = \pi + \tan^{-1} \frac{R \sin \theta}{R \cos \theta - D} \quad \begin{array}{l} \pi \leq \theta \leq 2\pi \\ \pi \leq \gamma \leq 2\pi \end{array} \quad (8)$$

when we assume the principal range of $\tan^{-1}$ is 0 to $\pi$. Evaluating the Jacobian, we find that $$\frac{\delta r_1}{\delta \beta} = Z \cos \beta \quad (9)$$

$$\frac{\delta r_1}{\delta \theta} = \frac{RD \sin \theta}{Z} \sin \beta \quad (10)$$

$$\frac{\delta \alpha_1}{\delta \beta} = 1 \quad (11)$$

$$\frac{\delta \alpha_1}{\delta \theta} = \frac{\delta \gamma}{\delta \theta} = \frac{R^2 - RD \cos \theta}{Z^2} \quad (12)$$

Thus, $$J_1 = \frac{R^2 \cos \beta - RD \cos(\theta - \beta)}{Z} \quad (13)$$

We must also consider the term $$\frac{\delta}{\delta r_1} \{H_p(\theta,\beta)\} = \frac{\delta H_p}{\delta \theta} \frac{\delta \theta}{\delta r_1} + \frac{\delta H_p}{\delta \beta} \frac{\delta \beta}{\delta r_1} \quad (14)$$

The derivatives $\partial\theta/\partial r_1$ and $\partial\beta/\partial r_1$ can be obtained by implicitly differentiating equations (5) and (6). Consider equation (5). Its derivative is $$1 = \frac{RD \sin \theta \sin \beta}{Z} \frac{\delta \theta}{\delta r_1} + Z \cos \beta \frac{\delta \beta}{\delta r_1} \quad (15)$$

Similarly the derivative of equation (6) with respect to $r_1$ is $$0 = \frac{R^2 - RD \cos \theta}{Z^2} \frac{\delta \theta}{\delta r_1} + \frac{\delta \beta}{\delta r_1} \quad (16)$$

Solving equations (15) and (16) for $\partial\theta/\partial r_1$ and $\partial\beta/\partial r_1$, we obtain $$\frac{\delta \theta}{\delta r_1} = \frac{Z}{RD \cos(\theta - \beta_1) - R^2 \cos\beta_1} \quad (17)$$

$$\frac{\delta \beta}{\delta r_1} = \frac{RD \cos \theta - R^2}{Z \{RD\cos(\theta - \beta) - R^2 \cos\beta\}} \quad (18)$$

Substituting all these results into equation (3) we finally obtain $$D(P) = -\frac{1}{2\pi^2} \int_0^{2\pi} d\theta \int_0^\pi d\beta_1 \frac{1}{Z \sin\beta} \cdot \quad (19)$$

$$\left\{ -\frac{\delta H_p(\theta,\beta_1)}{\delta \theta} + \frac{R^2 - RD\cos\theta}{Z^2} \frac{\delta H_p(\theta,\beta)}{\delta \beta} \right\}$$

Consider the term containing $$\frac{\delta H_p(\theta,\beta)}{\delta \theta}$$

It can be integrated by parts with respect to $\theta$ to obtain $$\int_0^{2\pi} d\theta \frac{1}{Z} \frac{\delta H_p}{\delta \theta} = \int_0^{2\pi} d\theta \frac{RD \sin\theta}{Z^3} H_p(\delta,\beta) \quad (20)$$

Thus we obtain $$D(P) = -\frac{1}{2\pi^2} \int_0^{2\pi} d\theta \frac{RD \sin\theta}{Z^3} \int_0^\pi d\beta \left\{ \frac{-H_p(\theta,\beta)}{\sin\beta} \right\} - \quad (21)$$

$$\frac{1}{2\pi^2} \int_0^{2\pi} d\theta \frac{R^2 - RD\cos\theta}{Z^3} \int_0^\pi d\beta \frac{1}{\sin\beta} \frac{\delta H_p(\theta,\beta)}{\delta \beta}$$

In obtaining the above equation it has been assumed that the object does not exceed outside the arc covered by the fan beam emanating from the source S. Thus the line integrals of density of rays tangent to circles centered at P such that at least a portion of such circles lie outside the arc covered by the fan beam emanating from the source S are assumed to be zero, where said point of tangency also lies outside said fan beam.

If we again return to FIG. 3 and rewrite Equation (3) using $r_2$ and $\alpha_2$ rather than $r_1$ and $\alpha_1$ we can obtain a second equation for $D(P)$. Thus $$D(P) = -\frac{1}{\pi} \int_0^\infty dr_2 \frac{1}{r_2} \frac{\delta}{\delta r_2} \left\{ \frac{1}{2\pi} \int_0^{2\pi} d\alpha_2 H_p(\theta,\beta) \right\} \quad (22)$$

Again we wish to change the variables of integration from $dr_2 d\alpha_2$ to $d\beta d\theta$. Proceeding as before we have $$r_2 = -Z \sin\beta \quad (23)$$
$$\alpha_2 = \frac{\pi}{2} + \beta + \gamma \quad (24)$$

Evaluating the Jacobian we find $$J_2 = \frac{R^2 \cos\beta - RD\cos(\theta - \beta)}{Z} \quad (25)$$

Evaluating $\partial\theta/\partial r_2$ and $\partial\beta/\partial r_2$, we obtain $$\frac{\delta\theta}{\delta r_2} = \frac{Z}{R^2\cos\beta - RD\cos(\theta - \beta)} \quad (26)$$

$$\frac{\delta\beta}{\delta r_2} = \frac{R^2 - RD\cos\theta}{Z\{RD\cos(\theta - \beta) - R^2\cos\beta\}} \quad (27)$$

Substituting the expressions into Equation (22), we obtain $$D(P) = + \frac{1}{2\pi^2} \int_0^{2\pi} d\theta \int_{-\pi}^{0} d\beta \frac{1}{Z\sin\beta} \cdot \left\{ \frac{\delta H_p(\theta,\beta)}{\delta\theta} - \frac{R^2 - RD\cos\theta}{Z^2} \frac{\delta H_p(\theta,\beta)}{\delta\beta} \right\} \quad (28)$$

Again integrating $\partial H_p/\partial\theta$ with respect to $\theta$, $$D(P) = \quad (29)$$
$$+ \frac{1}{2\pi^2} \int_0^{2\pi} d\theta \frac{RD\sin\theta}{Z^3} \int_{-\pi}^{0} d\beta \frac{p(\theta,\beta)}{\sin\beta} -$$
$$\frac{1}{2\pi^2} \int_0^{2\pi} d\theta \frac{R^2 - RD\cos\theta}{Z^3} \int_{-\pi}^{0} d\beta \frac{1}{\sin\beta} \frac{\delta H_p}{\delta\beta}$$

Equations (21) and (29) can now be added to obtain $$D(P) = \quad (30)$$
$$\frac{1}{4\pi^2} \int_0^{2\pi} d\theta \frac{RD\sin\theta}{Z^3} \int_{-\pi}^{+\pi} d\beta \frac{H_p(\theta,\beta)}{\sin\beta} -$$
$$\frac{1}{4\pi^2} \int_0^{2\pi} d\theta \frac{R^2 - RD\cos\theta}{Z^3} \int_{-\pi}^{+\pi} d\beta \frac{1}{\sin\beta} \frac{\delta H_p(\theta,\beta)}{\delta\beta}$$

The following changes can now be made to Equation (30):

(1) Change the variable of integration from $\beta$ to $\delta$ where $\beta = \delta - \delta_o$.

(2) Change $H_p(\theta,\beta)$ to $H_o(\theta,\delta)$ where the subscript $o$ now reflects that $\delta$ is measured from the line connecting the point S and O, the center of rotation.

(3) Note that $$\frac{RD\sin\theta}{Z^3} = \frac{R\sin\delta_o}{Z^2} \quad (31)$$

(4) Note that $$\frac{r^2 - RD\cos\theta}{Z^3} = \frac{R\sin\delta_o}{Z^2} \quad (32)$$

Equation (30) then becomes $$D(P) = \quad (33)$$
$$\frac{1}{4\pi^2} \int_0^{2\pi} d\theta \frac{R\sin\delta_o}{Z^2} \int_{-\pi}^{+\pi} d\delta \frac{H_o(\theta,\delta)}{\sin(\delta - \delta_o)} -$$
$$\frac{1}{4\pi^2} \int_0^{2\pi} d\theta \frac{R\cos\delta_o}{Z^2} \int_{-\pi}^{+\pi} d\delta \frac{1}{\sin(\delta - \delta_o)} \frac{\delta H_o(\theta,\delta)}{\delta\delta}$$

Equation (33) is the desired result and is the exact solution. It covers the continuous case of data gathering. Although there appears to be a singularity at $\delta = \delta_o$, we are interested in the principal value of the integral. Note that the integral over $\delta$ is in the form of a convolution. Furthermore, if $R \to \infty$, Equation (33) reduces to the simpler parallel geometry case.

Although one could evaluate Equation (33) using analog methods, digital (discrete) techniques are usually employed instead for the following reasons:

(1) With parallel data extraction for fast data acquisition, it is convenient to use a number of discrete detector elements coupled to an equal number of discrete electronic amplifiers.

(2) Because of statistical variations in detected radiation values with finite total radiation exposure and hence finite number of radiation quanta, a point of diminishing returns is reached where dividing the discrete array detector into a larger number of finer elements does not materially improve the quality of the reconstructed image; therefore continuation of this division process to the limit of a continuous detector is not justified.

(3) With continuous rotation of source angular position, the finite fan beam thickness spreads over an equivalent angular spread of the detected data and since there are limits to the accuracy with which this angular spread can be deconvolved, little image quality is lost by exercising the convenience of using a finite number of source position angles.

(4) The presence of the singularity at $\delta = \delta_o$ is not easily handled by analog techniques.

(5) The accuracy required is higher than that normally obtained with analog computation methods.

Equation (33) can be reduced to discrete form as follows. The integrals over $\delta$ cover the full range from from 0 to $2\pi$. Thus we are free to begin and end at any point. Therefore Equation (33) can be written as $$D(P) = \quad (35)$$
$$\frac{1}{4\pi^2} \int_0^{2\pi} d\theta \frac{R\sin\delta_o}{Z^2} \int_0^{2\pi} d\delta \frac{H_o(\theta,\delta_o + \delta)}{\sin\delta} -$$
$$\frac{1}{4\pi^2} \int_0^{2\pi} d\theta \frac{R\sin\delta_o}{Z^2} \int_0^{2\pi} d\delta \frac{1}{\sin\delta} \frac{\delta H_o(\theta,\delta_o + \delta)}{\delta\delta}$$

Now let $\Delta$ be the angular distance between measurements and further let $\Delta = 2\pi/4N$. Then $H_o(\theta,\delta_o+\delta)$ can be expanded in a finite Fourier series as follows:

$$H_o(\theta,\delta_o + \delta) = \frac{a_o(\theta,\delta_o)}{2} + \sum_{n=1}^{2N-1} a_n(\theta,\delta_o)\cos(n\delta) + \quad (36)$$
$$\sum_{n=1}^{2N-1} b_n(\theta,\delta_o)\sin(n\delta) + \frac{a_{2N}(\theta,\delta_o)}{2}\cos(2N\delta)$$

Since $$\int_{-\pi}^{+\pi} \frac{\sin nx}{\sin x} dx = \begin{cases} 2\pi & n \text{ ODD} \\ 0 & \text{OTHERWISE} \end{cases} \quad (37)$$

and $$\int_{-\pi}^{+\pi} \frac{\cos nx}{\sin x} dx = 0 \quad (38)$$

Equation (35) can be written as:

$$D(P) = -\frac{1}{2\pi} \int_0^{2\pi} d\theta \frac{R\sin\delta_o}{Z^2} S_b(\theta,\delta_o) + \quad (39)$$
$$\frac{1}{2\pi} \int_0^{2\pi} d\theta \frac{R\cos\delta_o}{Z^2} S_a(\theta,\delta_o)$$

where $$S_a(\theta,\delta_o) = \sum_{\substack{n=1 \\ \& \text{ ODD}}}^{2N-1} na_n(\theta,\delta_o) \quad (40)$$

$$S_b(\theta,\delta_o) = \sum_{\substack{n=1 \\ \& \text{ ODD}}}^{2N-1} b_n(\theta,\delta_o) \quad (41)$$

Now $$a_n(\theta,\delta_o) = \frac{1}{2N} \sum_{m=0}^{4N-1} H_o(\theta,\delta_o + m\Delta)\cos(mn\Delta) \quad (42)$$

$$b_n(\theta,\delta_o) = \frac{1}{2N} \sum_{m=0}^{4N-1} H_o(\theta,\delta_o + m\Delta)\sin(mn\Delta) \quad (43)$$

Therefore $$S_a(\theta,\delta_o) = \frac{1}{2N} \sum_{m=0}^{4N-1} H_o(\theta,\delta_o + m\Delta) \sum_{\substack{n=1 \\ \& \text{ ODD}}}^{2N-1} n\cos(nm\Delta) \quad (44)$$

-continued $$S_b(\theta,\delta_o) = \frac{1}{2N} \sum_{\substack{m = 0}}^{4N-1} H_o(\theta,\delta_o + m\Delta) \sum_{\substack{n = 1 \\ \& \text{ ODD}}}^{2N-1} \sin(nm\Delta) \quad (45)$$

2

The summations over n can be evaluated $$\sum_{\substack{n = 1 \\ \text{8 ODD}}}^{2N-1} n\cos(nm\Delta) = \frac{d}{d(m\Delta)} \left( \frac{\sin^2(Nm\Delta)}{\sin(m\Delta)} \right) = \quad (46)$$

$$\begin{cases} N^2 & m = 0 \\ -\frac{\cos(m\Delta)}{\sin^2(m\Delta)} & m \text{ ODD} \quad \Delta = \frac{2\pi}{4N} \\ 0 & m \text{ EVEN} \end{cases}$$

and $$\sum_{\substack{N = 1 \\ \text{8 ODD}}}^{2N-1} \sin(nm\Delta) = \frac{\sin^2(Nm\Delta)}{\sin(m\Delta)} = \quad (47)$$

$$\begin{cases} 0 & m \text{ EVEN} \\ \frac{1}{\sin(m\Delta)} & m \text{ ODD} \quad \Delta = \frac{2\Sigma}{4N} \end{cases}$$

If we now replace N by $(\pi/2\Delta)$, then we can write $$S_a(\theta,\delta_o) = \left( \frac{\pi}{4\Delta} \right) H_o(\theta,\delta_o)$$

$$- \left( \frac{\Delta}{\pi} \right) \sum_{m \text{ ODD}} \frac{\cos(m\Delta)}{\sin^2(m\Delta)} H_o(\theta,\delta_o + m\Delta) \quad (48)$$

and $$S_b(\theta,\delta_o) = \left( \frac{\Delta}{\pi} \right) \sum_{m \text{ ODD}} \frac{1}{\sin(m\Delta)} H_o(\theta,\delta_0 + m\Delta) \quad (49)$$

If we now substitute Equations (48) and (49) into Equation (39) and replace the integration over $\theta$ by a summation, we obtain:

$$D(P) =$$

$$\sum_{\theta} d\theta \left\{ \frac{R\sin\delta_o}{Z^2} \left[ \left( \frac{\Delta}{2\pi^2} \right) \sum_{m \text{ ODD}} \frac{1}{\sin(m\Delta)} H_o(\theta,\delta_o + m\Delta) \right] + \frac{R\cos\delta_o}{Z^2} \left[ \frac{1}{8\Delta} H_o(\theta,\delta_o) - \left( \frac{\Delta}{2\pi^2} \right) \sum_{m \text{ ODD}} \frac{\cos(m\Delta)}{\sin^2(m\Delta)} H_o(\theta,\delta_o + m\Delta) \right] \right\} \quad (50)$$

This again can be simplified to $$D(P) = \sum_{\theta} d\theta \frac{R}{Z^2} \left\{ \frac{H_o(\theta,\delta_o)\cos\delta_o}{8\Delta} - \frac{\Delta}{2\pi^2} \sum_{m \text{ ODD}} \frac{\cos(\delta_o + m\Delta)H_o(\theta,\delta_o + m\Delta)}{\sin^2(m\Delta)} \right\} \quad (51)$$

In both Equations (50) and (51), the limits on the summation over m have not been written. This summation is taken over all detectors; m can be both positive or negative and is simply the number of detectors away from the detector at $\beta_o$.

The expression within brackets in Equation (51), which must be evaluated first, represents a convolution and the remaining portion of Equation (51) represents a back-projection. The slow way to evaluate Equation (51) would be to calculate the absorption density at each point P for each of the values detected; but there are faster ways of solving Equation (51) for many values of P at once. Typically P's are about 40,000 in number, representing a 200×200 grid superimposed over object 50. The points P may be uniformly spaced or non-uniformly spaced. When 360 values were chosen for $\theta$ and 300 detectors were selected, the data collection was performed in about 6 seconds. This is between one and two orders of magnitude faster than the existing prior art for the same quality picture. One sees that as $\Delta$ decreases and the numbers of measurements, $\theta$'s, and P's increase, a more accurate picture may be obtained but at a cost of greater data collection and reduction times.

As stated before, the $H_o(\theta,\delta_o+m\Delta)$'s are obtained as a result of measurements taken at detector elements 65. The index m is measured from $\delta_o$, i.e., the location of the line through the point of interest P running from source S to the detector elements. In other words $H_o(\theta,S_o)$ represents that detector element along the straight line running from S through P; $H_o(\theta,S_o+\Delta)$, $H_o(\theta,\delta_o+2\Delta)$, etc. represent the detector elements running sequentially in one direction from $\delta_o$; and $H_o(\theta,\delta_o-\Delta)$, $H_o(\theta,S_o-2\Delta)$, etc., the detector elements running sequentially in the opposite direction. The data from the detectors may be extracted serially or in parallel.

For each value of $\theta$ and for each value of $\delta_o$, a single convolution profile value is calculated and stored in a storage device or array $C(\theta,\delta_o)$. This calculation for all $\delta_o$'s for each $\theta$ may be performed as soon as the data-gathering phase for that particular $\theta$ is complete, i.e., while the source continues to rotate about its path. The outer loop (the back-projection portion) of Equation (51) may also be completed for each $\theta$ as soon as all measurements for that particular $\theta$ have been read into storage and the inner loop (convolution) is complete. Thus, measurements and calculations are performed simultaneously; this is one, but by no means the most important, way the technique of the present invention saves time.

At the time of the back-projection loop, interpolations are performed to take into account the fact that most of the P's do not lie along a line running from the source S to the mid-point of a detector element. It is sufficient but not necessary that the interpolations be linear. The convolutions profile values utilized in the linear interpolation are those associated with the mid-points (or other normal detection points) of those detector elements adjacent to the point along the detector array cut by the straight line running from the source S through the point P in question. This interpolation could also be performed during the convolution step.

After all calculations have been performed, the values of absorption densities at each point P may then be portrayed in graphic form as output picture 80.

Figure 4:
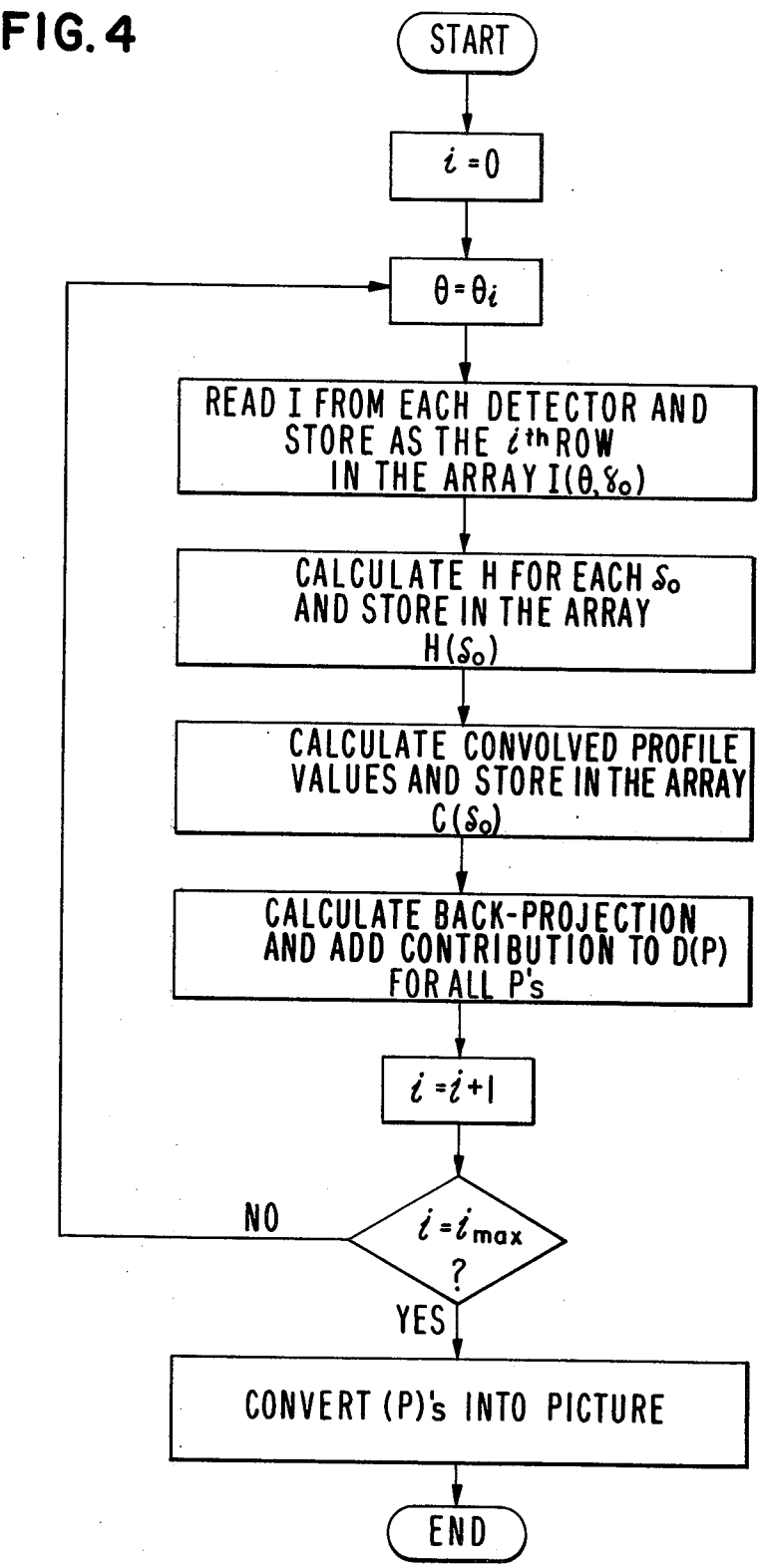
FIG. 4 is a flow diagram which illustrated a typical embodiment of data acquisition and reconstruction in the discrete embodiment of the instant invention.

A greater insight into how an output picture is produced may be obtained by studying FIG. 4. The index for $\theta$ is i and is initialized to zero. At $\theta_i$ radiation passes through the object and is read by the detector elements as values of I. At this point the source is free to rotate to its next value of $\theta$; this in fact would be done if the main criterion were to minimize the data gathering time, or if two processors existed within the computer, one for data gathering and one for data reduction. In the latter case, much of the data reduction could be performed simultaneously with the data collection. However (for purposes of discussion but without intending to limit in any way the invention), the flow chart shows a data-reconstruction embodiment in which calculations are performed at this time, before the source rotates to its next value of $\theta$. In the case of administering X-radiation to humans, this does not result in extra radiation entering the body, because the radiation is normally pulsed for just a short time for each value of $\theta$. Next, H is calculated at each detector element and stored in the storage area or array H $(\theta,\delta_o)$. At this point, the source may rotate to its next value of $\theta$, and the same considerations govern as the desirability of so doing. For $\theta_i$ and each value of $\delta_o$ the convolution profile value is obtained and stored in a second storage area or array C $(\theta,\delta_o)$. Again at this point the source may rotate to its next value of $\theta$; however, the flow diagram illustrates the case where an additional step is performed at this time.

It will readily be seen that many permutations of the steps are possible. The important point is that for each set of measurements taken for a particular $\theta$, either the convolution step or the convolution step plus the back projection step may be performed at that time, with or without subsequent rotation and measurement gathering for additional values of $\theta$. Unless the processor is extremely fast, if the same processor is both reading the data and performing the convolution and back-projecting steps, then normally all of the data will first be read so as to minimize the data collection time. If, on the other hand, an additional processor is employed for just the data gathering step, then much time can be saved by providing for simultaneous performance of the convolution and back-projection steps.

Notice that for each P, Z is unique and may be preobtained; Z may also be thought of as a function of $\theta$ and $\delta$ or $\theta$ and m. During the outer loop (the back projection portion), a correction is performed by means of linear or other interpolation to take into account the fact that the line running from the source S through the point P will not normally strike a detector element at its midpoint (or other point in the detector element where the measurement is normally taken).

In other words, if the cognizant line strikes the detector bank 1/10 of the distance between the detection points of detector elements $m_1$ and $m_2$, then it is assumed for the purposes of the calculation that the equivalent value of C for this line is 9/10 the C based at $m_1 + 1/10$ the C based at $m_2$.

Returning to FIG. 4, the index i is then incremented. The question is asked, "Does i equal the maximum value preselected?" (A typical value for $i_{max}$ is 360). If not, then the value of $\theta$ is incremented accordingly and a new series of measurements or measurements plus calculations is performed. If i equals $i_{max}$, then we know that we are done with the data collection and pre-calculation portions of the process and all that remains is to complete the calculations and convert the D(P)'s into picture form. In the case illustrated by FIG. 4, all that remains is, for each value of P, to convert the D(P)'s into picture form for visual inspection by the observer.

Much of the above discussion, which pertains to the discrete embodiment, also applies to the continuous embodiment, i.e., the graphic portrayal of equation (33).

The following listing of a computer program, written in the FORTRAN language for an IBM 360 computer, implements a typical embodiment of the invention that was described above.

```
                    OS/360 FORTRAN H
       COMPILER OPTIONS - NAME=MAIN,OPT=02,LINECNT=58,SIZE=0000K,
              SOURCE,EBCDIC,NOLIST,DECK,LOAD,MAP,NOEDIT,ID,NOXREF
C          RECONSTRUCTION PROGRAM - FAN BEAM GEOMETRY              1.
C                                                                  2.
           COMMON /CTITLE/ TITLE (23)                               3.
           INTEGER*4 TITLE                                          4.
C                                                                  5.
           COMMON /CMESH/ NX,NY,NTOT,X1,X2,XINCR,Y1,Y2,YINCR        6.
C                                                                  7.
           COMMON /COSSIN/ WCOS(1000),WSIN(1000)                    8.
C                                                                  9.
           DIMENSION RECON(2000)                                   10.
           DIMENSION PJDATA(1000),PJCONV(1000)                     11.
           DIMENSION CCFNTN(1000),SCFNTN(1000)                     12.
C                                                                 13.
           DATA LBLNK/4H  /                                        14.
           DATA LMESH,LPROJ/'MESH','PROJ'/                         15.
C                                                                 16.
     20    IQUIT = 0                                               17.
           READ (5,25,END=9999) (TITLE(I), I = 1,20,1)             18.
     25    FORMAT (20A4)                                           19.
           TITLE(21) = LBLNK                                       20.
           CALL DATE(TITLE(22))                                    21.
           WRITE (6,35) TITLE                                      22.
     35    FORMAT (1H1, 'RECONSTRUCTION TEST',5X,23A4)             23.
C                                                                 24.
C                                                                 25.
C          READ DATA DEFINING PHANTOM                             26.
     100   CALL ELDATA                                             27.
C                                                                 28.
C          READ DATA DESCRIBING RECONSTRUCTION                    29.
C                                                                 30.
     200   READ (5,215) NTEST                                      31.
     215   FORMAT (A4)                                             32.
           IF (INTEST .NE. LMESH) STOP                             33.
           READ (5,225) NX,NY,XORG,YORG,XINCR,YINCR,PJNORM,XNORM   34.
     225   FORMAT 2I10,6F10,5)                                     35.
           XRANG = XINCR*FLOAT(NX - 1)                             36.
           YRANG = YINCR*FLOAT(NY - 1)                             37.
           X1 = XORG - 0.5*XRANG                                   38.
           X2 = XORG + 0.5*XRANG                                   39.
```

OS/360 FORTRAN H
COMPILER OPTIONS - NAME=MAIN,OPT=O2,LINECNT=58,SIZE=0000K,
SOURCE,EBCDIC,NOLIST,DECK,LOAD,MAP,NOEDIT,ID,NOXREF

```
                Y1 = YORG - 0.5*YRANG                                    40.
                Y2 = YORG + 0.5*YRANG                                    41.
                WRITE (6,235) NX,XORG,XINCR,X1,X2,NY,YORG,YINCR,Y1,Y2    42.
      2350      FORMAT (1HO,10X,'MESH DATA'/1HO,15X,                     43.
         1        'NX = ',I4,'XORG =',F10.5,8X,'XINCR =',F10.5,8X,       44.
         2        'X1 =',F10.5,8X,'X2 =',F10.5/1H, 15X,                  45.
         3        'NY =',I4,8X,'YORG =',F10.5,8X'YINCR =',F10.5,8X,      46.
         4        'Y1 =',F10.5,8X,'Y2 =',F10.5)                          47.
                IF (PJNORM .NE. 0.0) WRITE (6,236) PJNORM                48.
      2360      FORMAT (1HO,15X,'RESULTS NORMALIZED TO DESNTIY*LENGTH',  49.
         1        ' FOR MAXIMUM MEASUREMENT OF',F11.5)                   50.
                IF (XNORM .NE. 0.0) WRITE(6,238) XNORM                   51.
      238       FORMAT (1HO,15X,'RESULTS NORMALIZED TO ',F10.5)          52.
C                                                                        53.
C               READ PROJECTION DATA                                     54.
C                                                                        55.
                READ (5,245) NTEST                                       56.
      45        FORMAT (A4)                                              57.
                IF (NTEST .NE. LPROJ) STOP                               58.
C                                                                        59.
      0         READ (5,255) NPROJ,NRAYS,TOTANG,WIDRAT,RADIUS,THETA,     60.
      1           OFFSET,NETYPE                                          61.
      255       FORMAT (2I10,5F10.5,I10)                                 62.
                WRITE (6,265) NPROJ,TOTANG,RADIUS,OFFSET,NRAYS,WIDRAT,THETA 63.
      2650      FORMAT (1HO,10X, 'PROJECTION DATA'/1HO,15X,              64.
         1        'NPROJ =',I4,5X'TOTAL ANGLE =',F10.5,5X,               65.
         2        'SOURCE RADIUS =',F10.5,5X,'OFFSET =',F10.5/1H,15X,    66.
         3        'NRAYS =',I4,5X,'WIDTH RATIO =',F10.5,5X,              67.
         4        'FIRST ANGLE  =',F10.5)                                68.
C                                                                        69.
                IF (NETYPE .NE. O) CALL EPDATA(NETYPE)                   70.
C                                                                        71.
      300       RAYSPG = TOTANG/(57.29578*FLOAT(NRAYS - 1))              72.
                RAYWID = WIDRAT*RAYSPG                                   73.
C                                                                        74.
                CENTER = 0.5*FLOAT(NRAYS + 1)                            75.
                D0 380 N = 1,NRAYS,1                                     76.
                  BETA = RAYSPG*(FLOAT(N) - CENTER - OFFSET)             77.
                  WSIN(N) = SIN(BETA)                                    78.
                  WCOS(N) = COS(BETA)                                    79.
      380       CONTINUE                                                 80.
C                                                                        81.
C               CLEAR RECONSTRUCTION AREA                                82.
C                                                                        83.
      600       NTOT = NX*NY                                             84.
                IF (NTOT .LE. 2000) GO TO 640                            85.
                  IQUIT = 1                                              86.
                  WRITE (6,615)                                          87.
      615         FORMAT (1HO,5X,'TOO MANY MESH POINTS')                 88.
                  GO TO 700                                              89.
      640       DO 660 N = 1,NTOT,1                                      90.
                  RECON(N) = 0.0                                         91.
      660       CONTINUE                                                 92.
C                                                                        93.
C               GET CONVOLUTION FUNCTION                                 94.
C                                                                        95.
      700       CALL CNVLFN(NRAYS,TOTANG,CCFNTN,SCFNTN,INCR)             96.
                IF (IQUIT .NE. O) GO TO 20                               97.
C                                                                        98.
C               PERFORM RECONSTRUCTION                                   99.
C                                                                       100.
      1000      ALPHO = THETA/57.29578                                  101.
                DALPH = 6.283185/FLOAT(NPROJ)                           102.
                AZERO = 0.5*FLOAT(NRAYS + 1) + OFFSET                   103.
                CO = 0.999992/RAYSPG                                    104.
                C2 = -0.332127/RAYSPG                                   105.
                C4 = 0.173750/RAYSPG                                    106.
C                                                                       107.
                NPLUS = NRAYS/2                                         108.
                XN1 = FLOAT(NX - 1)                                     109.
                YN1 = FLOAT(NY - 1)                                     110.
      0         RCALC = RADIUS*AMINI(ABS(WSIN(1)),ABS(WSIN(NRAYS)))     111.
      1           -0.5*RADIUS*RAYSPG                                    112.
                PJMAX = 0.0                                             114.
                DO 1400 NP = 1,NPROJ,1                                  115.
                  ALPHA = ALPHO + DALPH*FLOAT(NP - 1)                   116.
      0           IF (NETYPE .GE. O) CALL FANGEN(ALPHA,PJDATA,RADIUS,   117.
      1             NRAYS,RAYSPG,PAYWID)                                118.
      0           IF (NETYPE .NE. O) CALL FANERR(ALPHA,PJDATA,RADIUS,   119.
```

-continued

OS/360 FORTRAN H
COMPILER OPTIONS - NAME=MAIN,OPT=02,LINECNT=58,SIZE=0000K,
SOURCE,EBCDIC,NOLIST,DECK,LOAD,MAP,NOEDIT,ID,NOXREF

```
                       NRAYS,RAYSPG,RAYWID)                                120.
                       DO 1020 NR = 1,NRAYS,1                              121.
                       IF (PJDATA(NR) .GT. PJMAX) PJMAX = PJDATA(NR)       122.
           1020        CONTINUE                                            123.
C                                                                          124.
C           INITIALIZE CONTROL PARAMETERS                                  125.
C                                                                          126.
                       SINT = SIN(ALPHA)                                   127.
                       COST = COS(ALPHA)                                   128.
                       DROX = - XINCR*COST                                 129.
                       DRDY = - YINCR*SINT                                 130.
                       DZDX = + XINCR*SINT                                 131.
                       DZDY = - YINCR*COST                                 132.
                       RORG = RADIUS - X1*COST - Y1*SINT                   133.
                       ZORG = X1*SINT - Y1*COST                            134.
C                                                                          135.
                       TMIN = ZORG/RORG                                    136.
                       TMAX = TMIN                                         137.
C                                                                          138.
                       RTEMP = RORG + XN1*DRDX                             139.
                       ZTEMP = ZORG + XN1*DZDX                             140.
                       TEMP = ZTEMP/RTEMP                                  141.
                       IF (TEMP .LT. TMIN) TMIN = TEMP                     142.
                       IF (TEMP .GT. TMAX) TMAX = TEMP                     143.
C                                                                          144.
                       RTEMP = RORG + YN1*DRDY                             145.
                       ZTEMP = ZORG + YN1*DZDY                             146.
                       TEMP = ZTEMP/RTEMP                                  147.
                       IF (TEMP .LT. TMIN) TMIN = TEMP                     148.
                       IF (TEMP .GT. TMAX) TMAX = TEMP                     149.
C                                                                          150.
                       RTEMP = RORG + XN1*DROX + YN1*DRDY                  151.
                       ZTEMP = ZORG + XN1*DZDX + YN1*DZDY                  152.
                       TEMP = ZTEMP/RTEMP                                  153.
                       IF (TEMP .LT. TMIN) TMIN = TEMP                     154.
                       IF (TEMP .GT. TMAX) TMAX = TEMP                     155.
C                                                                          156.
                       AA = TMIN*TMIN                                      157.
                       ALPHA = TMIN*(CO + AA*(C2 + AA*C4)) + AZERO         158.
                       NRI = IFIX(ALPHA)                                   159.
                       IF (NR1 .LE. O) NR1 = 1                             160.
C                                                                          161.
                       AA = TMAX*TMAX                                      162.
                       ALPHA = TMAX*(CC + AA*(C2 + AA*C4)) + AZERO         163.
                       NR2 = IFIX(ALPHA) + 1                               164.
                       IF (NR2 .GT. NRAYS) NR2 = NRAYS                     165.
C                                                                          166.
C           CONVOLVE PROJECTION DATA WITH CONVOLUTION FUNCTION             167.
C                                                                          168.
                       DO 1200 NR = NR1,NR2,1                              169.
                          CSUM = 0.0                                       170.
                          SSUM = 0.0                                       171.
                          JSUM = MINO(NR - 1,NRAYS - NP)                   172.
                          JMAX = MAXO(NR - 1,NRAYS - NR)                   173.
                          IF (JSUM .EQ. JMAX) GO TO 1140                   174.
                          JMIN = INCR*((JSUM + INCR - 1)/INCR) + 1         175.
                          IF (JMIN .GT. JMAX) GO TO 1140                   176.
                          IF (NR .LE. NPLUS) GO TO 1080                    177.
                             JADD = INCR                                   178.
                             JJ = MR - JMIN - JADD                         179.
                             GO TO 1100                                    180.
           1080              JADD = INCR                                   181.
                             JJ = NR + JMIN - JADD                         182.
           1100           DO 1120 J = JMIN,JMAX,INCR                       183.
                             JJ = JJ + JADD                                184.
                             CSUM = CSUM + CCFNTN(J+1)*PJDATA(JJ)          185.
                             SSUM = SSUM + SCFNTN(J+1)*PJDATA(JJ)          186.
           1120           CONTINUE                                         187.
                          IF (JADD .LT. O) SSUM = - SSUM                   188.
           1140           IF (JSUM .EQ. O) GO TO 1180                      189.
                          DO 1160 J = 1,JSUM,INCR                          190.
              0             CSUM = CSUM + CCFNTN(J+1)*(PJDATA(NR+J)        191.
              1                     PJDATA(NR-J))                         192.
              0             SSUM = SSUM + SCFNTN(J+1)*(PJDATA(NR+J)        193.
              1                     - PJDATA(NR-J))                        194.
           1160           CONTINUE                                         195.
C                                                                          196.
           1180          CSUM = CSUM + CCFNTN(1)*PJDATA(NR)                197.
                        PJCONV(NR) = WCOS(NR)*CSUM - WSIN(NR)*SSUM         198.
```

```
                       OS/360 FORTRAN H
         COMPILER OPTIONS - NAME=MAIN,OPT=02,LINECNT=58,SIZE=0000K,
           SOURCE,EBCDIC,NOLIST,DECK,LOAD,MAP,NOEDIT,ID,NOXREF

1200        CONTINUE                                              199.
C                                                                       200.
C           PERFORM BACK PROJECTION OPERATION                           201.
C                                                                       202.
                  YN = - 1.0                                            203
                  DO 1380 IY = 1,NTOT,NX                                204.
                  YN = YN + 1.0                                         205.
                  YTEST = Y1 + YN*YINCR                                 206.
                  TEMP = RCALC**2 - YTEST**2                            207.
                  IF (TEMP .LE. O) GO TO 1380                           208.
                  XTEST = SQRT(TEMP)                                    209.
                  NX1 = IFIX((- XTEST - X1)/XINCR)                      210.
                  IF (NX1 .LT. O) NX1 = 0                               211.
                  NX2 = IFIX((XTEST - X1)/XINCR)                        212.
                  IF (NX2 .GE. NX) NX2 = NX - 1                         213.
                  IF (NX1 .GT. NX2) GO TO 1380                          214.
                  XN = FLOAT(NX1 - 1)                                   215.
                  R1 = RORG + YN*DRDY                                   216.
                  Z1 = ZORG + YN*DZDY                                   217.
                  NX1 = NX1 + IY                                        218.
                  NX2 = NX2 + IY                                        219.
                  DO 1360 I = NX1,MX2,1                                 220.
                  XN = XN + 1.0                                         221.
                  R = R1 + XN*DROX                                      222.
                  Z = Z1 + XN*DZDX                                      223.
                  A = Z/R                                               224.
                  AA = A*A                                              225.
                  ALPHA = A*(CO + AA*(C2 + AA*C4)) + AZERO              226.
                  IDX = IFIX(ALPHA)                                     227.
                  T2 = ALPHA - FLOAT(IDX)                               228.
                  T1 = 1.0 - T2                                         229.
                  DD = R**2 + Z**2                                      230.
       0          RECON(I) = RECON(I)                                   231.
       1            + (T1*PJCONV(IDX) + T2*PJCONV(IDX+1))/DO            232.
      1360      CONTINUE                                                233.
      1380        CONTINUE                                              234.
      1460      CONTINUE                                                235.
                  WRITE (6,1415) PJMAX                                  236.
      1415        FORMAT (1HO,10X,'MAXIMUM MEASUREMENT =',1PE12.5)      237.
C                                                                       238.
C           NORMALIZE RESULT                                            239.
C                                                                       240.
                  TMAX = RECON(1)                                       241.
                  DO 1500 N = 2,NTOT,1                                  242.
                  IF (RECON(N) .GT. TMAX) TMAX = RECON(N)               243.
      1500        CONTINUE                                              244.
                  FACT = RADIUS/(RAYSPG*FLOAT(NPROJ))                   245.
                  IF (PJNORM .NE. 0.0) FACT = PJNORM*FACT/PJMAX         246.
                  TEMP = FACT*TMAX                                      247.
                  WRITE (6,1525) TEMP                                   248.
      1525        FORMAT (1HO,10X,'MAXIMUM VALUE =',1PE12.5)            249.
C                                                                       250.
                  IF (XNORM .NE. O) FACT = XNORM/TMAX                   251.
                  DO 1600 N = 1,NTOT,1                                  252.
                  RECON(N) = FACT*RECON(N)                              253.
      1600        CONTINUE                                              254.
C                                                                       255.
C           PRINT RESULT                                                256.
C                                                                       257.
                  CALL PTDENS(RECON)                                    258.
                  GO TO 20                                              259.
C                                                                       260.
      9999        STOP                                                  261.
C                                                                       262.
                  END                                                   263.
               where
      ELDATA   reads data describing an object if simulated data is to be
               generated;
      CNVLFN   calculates the function to be convolved with the measured or
               calculated data;
      FANGEN   reads measured data from tape or calculates data in the case
               of a simulated object;
      FANERR   introduces errors into the data if desired;
      PTDENS   prints the results.
```

In a preferred data reconstruction system in accordance with the present invention the computer 70 appearing in FIG. 1 may be embodied in the form of a general purpose computer or "reconstructor". The latter is specifically adapted for use with the present invention, and so designed as in conjunction with the general purpose computer, to enable extremely rapid manipulative processing of data obtained pursuant to the invention. More specifically, the reconstructor may receive its input data and instructions from the aforementioned general purpose or host computer. After performing a specified sequence of computations, the reconstructor transfers the results back to the general purpose computer, which in turn functions during display, recording and/or for further processing.

The reconstructor which will be more fully described in connection with FIGS. 5 through 7, basically constitutes a pipeline processor. Control functions for the pipeline processor are provided by control logic which interfaces with the general purpose host computer — which may comprise for example a device such as the Varian Data Machines Model V76. The pipeline may thus be characterized as a highspeed special purpose computing device, which in fact performs the great bulk of reconstruction computations required by the present invention. In a general sense the reconstructor pipeline processor, as will become evident, can function in either a back projection or in a convolution mode of operation. In the convolution mode of operation the pipeline computes convolved data functions. In the back projection mode of operation the pipeline computes mass densities at each picture element (or "pixel") for display 90. The pipeline may also operate in a control mode of operation, during which phase the aforementioned control logic communicates with the general purpose computer or with the pipeline.

Figure 7:
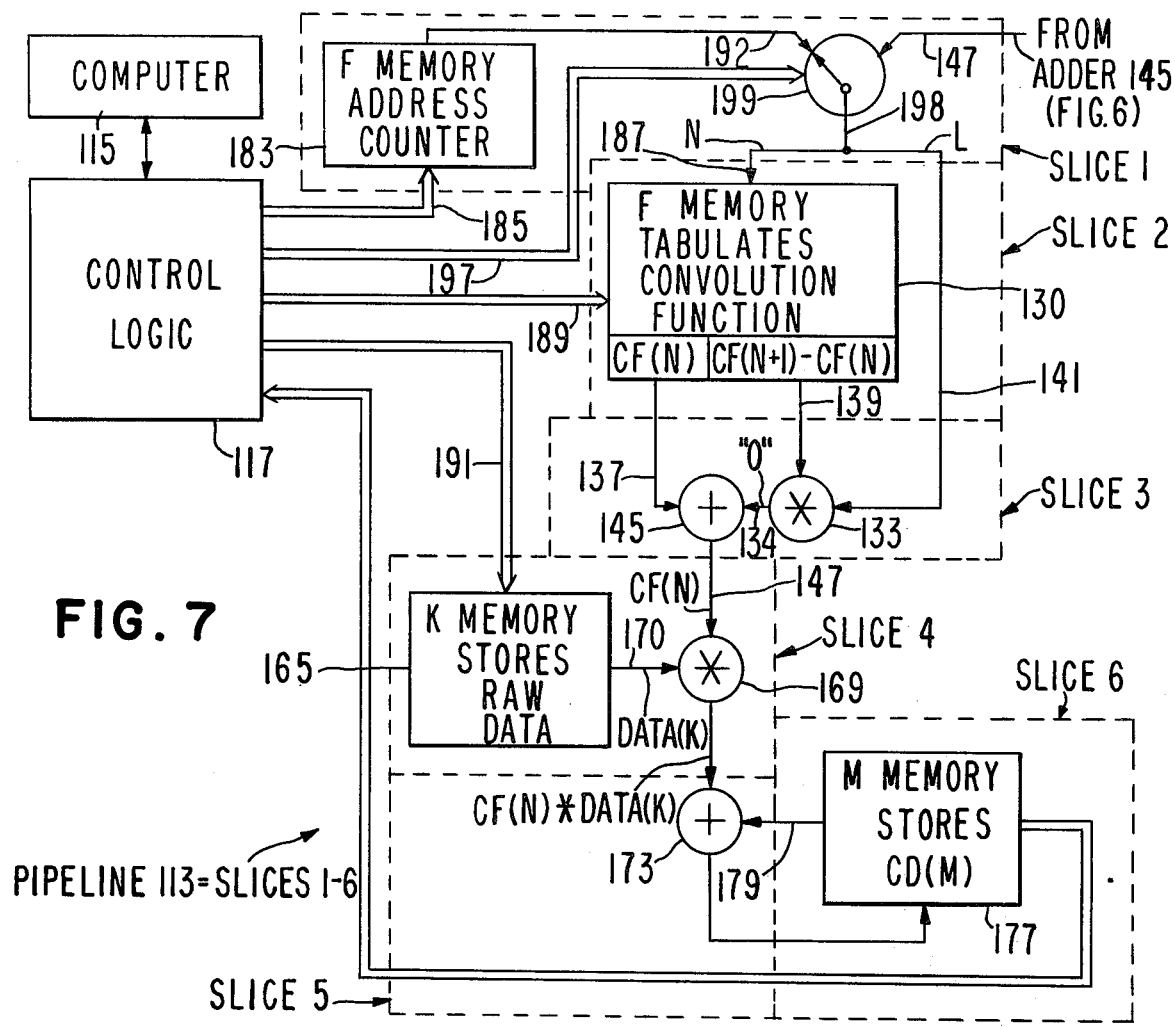
FIG. 7 is a schematic block diagram illustrating operation of the system of FIG. 6, in a convolution mode.
Figure 5:
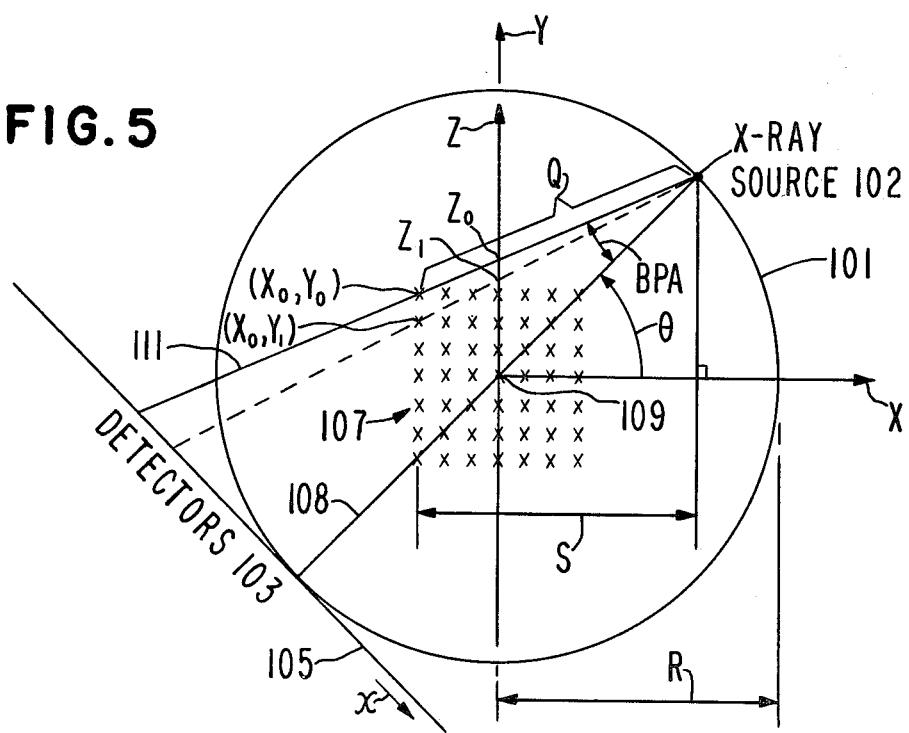
FIG. 5 is a schematic representation of the rotatable gantry portion of apparatus of the type appearing in FIG. 2, and sets forth schematic information useful to analysis of certain aspects of the invention.

In order to more fully appreciate the manner in which the special purpose computer or reconstructor of FIGS. 6 and 7 functions, reference may initially be had to FIG. 5 herein, setting forth a schematic representation of the rotatable gantry portion 10 of the present apparatus, and including various schematically portrayed information useful to analysis of the operation now to be described. In this schematic depiction it is seen that the penetrating radiation source, in this instance representatively shown as an x-ray source 102, is positioned at one side of the circle 101, representing the rotatable gantry 10. The radius of the said circle 101 is indicated as R. Directly opposed to x-ray source 102 at the opposite side of circle 101 there is schematically shown the array 103 of detectors. These are shown to be arranged along a straight line 105, which is a preferable arrangement for these devices; (as disclosed e.g. in the copending patent application of Kendall Dinwiddie et al, Ser. No. 677,958, filed Apr. 19, 1976 and entitled "Tomographic Scanning Apparatus") but they can also be arrayed along a curvelinear arc, as is known in this art, and illustrated in FIGS. 1 through 3. When the straight line locus is used, the plates constituting grid 66 are inclined, as may be the axis of each detector cell 65, so that each such cell and associated pair of collimator plates are oriented along a radius to source 102.

At the center of circle 101, a plurality of picture elements or "pixels" 107 are schematically illustrated. The actual number of such pixels in the reconstructed image which is eventually derived in accordance with the invention, as has previously been discussed, is actually much larger than indicated in the schematic showing; thus the total number of pixels 107 is representatively 65,536 — since there are typically 256 rows and 256 columns of same in the reconstructed image. X and Y coordinate axes are defined in the Figure, so that the location of individual pixels may be readily specified: Thus the uppermost pixel at the lefthand corner of the array is indicated as having coordinates $X_o$ and $Y_o$; the pixel immediately therebelow has coordinates $X_o$ and $Y_1$ and so forth.

Line 108 extending from x-ray source 102 through the center of rotation 109 to detector array 103, serves with the X axis to define the projection angle $\theta$, i.e. the angle at which data is being generated at the detector array in consequence of passage of radiation through the body portion being analyzed. A coordinate axis Z is also defined, which coincides with whichever of the X or Y axes is more nearly perpendicular to line 108. A distance specified as Q is also identified, representing the distance from x-ray source 102 to a particular pixel of interest (e.g. at $X_o, Y_o$). The distance S is also defined, representing the distance in the direction perpendicular to the Z-axis between source 102 and a pixel of interest. This distance will have further significance in the discussion set forth below. Finally, and of considerable significance for present purposes, is the back projection angle (BPA), which is defined as the angle between the x-ray beam center line 108 and the line 111 from the source 102 to the pixel of interest. This back projection angle BPA also, of course, corresponds to the anlge $\delta_o$ in FIG. 3 herein; for purposes of the present analysis, however, and for further clarity, the said angle will be consistently referred to as "BPA".

In considering FIG. 5 it may initially be noted that for any particular pixel located at coordinates $X_o, Y_N$ the line from the x-ray source passing through such pixel and incident on detector array intersects the Z-axis at a location given by the expression:

$$Z_n = R \frac{y_n \cos \theta - x_o \sin \theta}{R \cos \theta - x_o}$$

$$\Delta Z = Z_n - Z_{n-1} = R(y_n - y_{n-1})\cos \theta / R \cos \theta - x_o = R \frac{\Delta y \cos \theta}{R \cos \theta - x_o};$$

Hence, $$BPA_N = \tan^{-1}\left(\frac{Z_N \cos \theta}{R - Z_N \sin \theta}\right) \quad (54)$$

The expression (54) for angle BPA will shortly be useful, as will hereinbelow be set forth.

Referring now to the schematic showings of FIGS. 6 and 7, the special purpose computer, in the form of a pipeline 113 is set forth, which consists of six segments or slices, i.e. slices 1 through 6. Each slice performs one part of the total computation, and the output of each slice is utilized as the input to the next successive slice. The pipeline 113 is snychronized by a master clock — not shown in the present schematic depiction. Each of the slices begins its operation on the falling edge of the clock pulse. The clock period is rendered sufficiently long that all slices have ample time to finish their operation before the next falling edge of the clock. Each set of data originates in slice 1 during a given clock cycle (cycle N), passes to slice 2 in cycle N+1 etc., and reaches slice 6 in cycle N+5.

Considering the back projection operation in general terms, the task is one of computing from the convolved data functions a cross-sectional picture of the subject being examined. This is effected by segmenting the said picture into the aforementioned large number of pixels, and computing the mass density within each such pixel. In a typical such scheme, as already mentioned, the picture is divided into a 256×256 array of rows and columns, for a total of 65,536 pixels. Each pixel density is typically derived in this arrangement from 360 scanner projection angles, each represented by 1200 convolved data (CD) values. In overview the back projection procedure is as follows:

For each of the scanner projection positions $\theta$ the back projection angle for each pixel is computed. From that angle the convolved data functions CD are evaluated. More specifically such CD functions are evaluated by interpolation from a more limited number of values, i.e. typically from 1200 such values which are stored in a suitable memory, i.e. as a table of such values. It should be appreciated that the convolved data function CD is a function of the BPA. The said CD function is actually continuous but arbitrarily is calculated at a limited number of points, i.e. in this instance at 1200 equally spaced locations along the coordinate with interpolation being utilized to calculate the intermediate values of same.

Having evaluated the convolved data functions for the BPA of each pixel, the resultant value is scaled by the factor $(R/Q)^2$ to yield the density contribution to the particular pixel at the projection angle $\theta$ then under consideration. This value is added to a suitable memory, which accumulates the density contributions to the individual pixels for the successive projection angles at which the foregoing operations are repeated to derive other partial density contributions for the individual pixels.

The manner in which the aforementioned operations are brought about during back projection may be best understood by reference to FIG. 6. For each of the pixels 107, slice 1 first computes the variable Z, which measures the pixel position within the row or column. Since the pixels are equally spaced, $Z(N+1)=Z(N)+\Delta Z$, where $\Delta Z$ is the incremental distance between pixels on the Z axis of FIG. 5. This latter value is provided by general purpose computer 115 through control logic 117, line 118 and memory 119, and thus to adder 121 — which also receives the Z value of the prior pixel from memory 123 via line 125. The variable Z proceeding from memory 123 is cumulative by virtue of the loop 127 returning to memory 123 from adder 121. Thus the variable Z proceeds via line 129 during each cycle of the pipeline –this result being loaded into the Z memory 131 on the next clock pulse.

The actual scheme utilized is seen to be one wherein the integral portion N of Z is provided to Z memory 131, with the fractional portion k bypassing same and being provided to multiplier 133. Z memory 131 has previously been loaded with the values of BPA for a limited number of Z locations — which BPA values have been calculated by application of equation (54). The objective at this point is to calculate the BPA for the particular Z value pertinent to the pixel of interest from these tabulated values, using a linear interpolation scheme. Thus the integral portion of Z provided via line 135 is utilized to read out from Z memory 131 at output line 137 the BPA corresponding to the said integral portion — indicated in the Figure as BPA (N). At the same time the increment in the BPA between BPA for the value N and the next higher BPA, i.e. the quantity BPA (N+1)+BPA (N), is read out from the Z memory via line 139. The fractional portion K of Z proceeding via line 141 is then multiplied with the output in line 139 at multiplier 133. Thus in line 143 from multiplier 133 the quantity $K \times [BPA(N+1)-BPA(N)]$ appears. This quantity is added to the output in line 137 at adder 145, so that the resulting quantity emerging from adder 145 at line 147 is BPA (Z), and thus: (55) $BPA(Z)=BPA(N)+K\times[BPA(N+1)-BPA(N)]$ During the back projection mode of operation illustrated in FIG. 5, logic 117 acting through line 197 sets the data selector 199 to pass the data on line 147 on to the slice 1 output on line 198, thus yielding at such output the back projection angle BPA corresponding to the pixel of interest.

It may parenthetically be noted in connection with the prior several paragraphs that a "line" such as at 129 proceeding from memory 123, may actually consist of a plurality of separate electrically distinct signal carriers, i.e. such "line" may be in the nature of a data bus. Accordingly the splitting off of plural lines such as at 135 and 141 (which carry distinct signals) merely represents in the schematic Figure the divergence of signal carriers which were in fact distinct from one another when incorporated into the common bus.

The function performed in the next successive slice, i.e. slice 2, is one of providing the convolved data CD at a given scanner position as a function of the developed back projection angle BPA. In order to simplify certain calculations herein, consideration should momentarily be given to the fact previously elucidated that the density of a particular pixel is given by the expression:

Density of Pixel $= \Sigma CD\ (BPA) \times (R/Q)^2$ $$\text{where } Q = S\left(\frac{R}{\cos\beta + \sin\beta \tan\theta}\right); \beta \equiv BPA$$

We may arbitrarily define an auxiliary function CD* which is also a geometrically scaled function of the back projection angle, as follows:
$CD^*(\beta) = CD(\beta)(\cos\beta + \sin\beta\tan\theta)^2; \beta = BPA.$ Hence, the density of the pixel may also be given by the expression:

$$\text{Density of Pixel} = \sum_\theta CD^*(\beta)\left(\frac{R}{S}\right)^2,$$

where S has already been identified by reference to FIG. 5. Since S is constant for each column of pixels and each $\theta$, one only is required to compute S for each 256 pixels — where the auxiliary function CD* is utilized. This simplifies the requirements of computation and eases the burden upon the computer 115, and also enables the calculations to be effected at differing times, thus making better use of computer 115. Returning to slice 2 in FIG. 6 it will thus be seen that the F memory 147 actually tabulates the auxiliary function CD* (BPA) — which has previously been provided to F memory 147 via line 151 from computer 115 via logic 117. Computer 115, in turn, calculates CD values from CD values which are determined during operation of pipeline 113 in its convolution mode — which will be discussed hereinbelow.

The same type of linear interpolation scheme that has previously been discussed in connection with slice 1 is utilized for slice 2. In particular it is seen that the back projection angle of the pixel of interest, i.e. proceeding via line 198, is split, with only the integral portion M thereof, being furnished to F memory 130. The fractional portion thereof, L, proceeds via the bypassing line 153, and is furnished to a multiplier 155. There is thus read out from F memory 130 at line 157 a value CD*(M) corresponding to the address M, and at line 159 the incremental value between CD*(M) and the next higher value of CD* — i.e. the quantity CD*(M+1)−CD*(M). This last quantity is furnished to the multiplier 155. Thus the output from the multiplier 155 is the quantity which is then added to the output in line 157 at adder 161 to finally yield an output for slice 3, i.e. at line 163 the value CD*(BPA)=CD*(M)+L×[CD*(M+1)−CD*(M)].

At the next successive slice of pipeline 113, i.e. at slice 4, the convolved data CD* proceeding from slice 3 via line 163, is multiplied by a geometrical scaling factor. This factor, i.e. $(R/S)^2$ is read out from the K memory 165, which is provided with these scaling quantities from computer 115 and logic 117 via line 167. The two factors proceeding to multiplier 169 at slice 4 thus yield at the output line 171 from such multiplier the quantity CD*(BPA)×$(R/S)^2$=CD (BPA)×$(R/Q)^2$. Thus it is seen that at this point the auxiliary function CD* is returned to the desired form for contribution to the total density of the pixel then being considered.

Finally, and continuing in the analysis of the back projection operation, at slices 5 and 6 of pipeline 113, the contributions of density to each pixel are accumulated. Specifically it is seen that the output from slice 4 via line 171 is provided to adder 173 at slice 5, and the output of the adder is furnished via line 175 to the M memory 177 which holds the picture density for each pixel. It is noted that adder 173 is in a loop with an output from M memory 177 at line 179. Hence a cummulative action is effected, i.e. M memory 177 holds the cummulative density for the individual pixels as a result of contributions effected during operations at each projection angle $\theta$. The M memory communicates via an output line 181 with logic 117 and general purpose computer 115, to enable display or the like of the desired viewing image.

In FIG. 7 herein, the operation of pipeline 113 is shown during the convolution operation. In the course of such operation, as has been discussed in early portions of the specification, the convolved data functions CD are derived from the scanner projection data, i.e. from the raw data provided from the detector array, and from a specified convolution function. In the Figure, the operations occurring at the various slices discussed in connection with back projection operation are again set forth.

In considering the convolution operation it may be initially noted that the general mathematical operation involved in computing the convolved data functions for integral values of BPA's, i.e. CD(M) is given by the expression $$CD(M) = \sum_K DATA(K) \times CF(M - K), \quad (55)$$

where K is the particular detector number in the detector element array, the summation being effected over the variable K for the products of the DATA (K) with the convolution function CF for (M-K).

During convolution operation the only portion of slice 1 which actively participates is the F memory address counter 183, which is in communication with logic 117 through line 185 as indicated. The addresses N are successively read-out through line 187. Logic 117 acting through line 197 sets data selector 199 to pass the data on line 187 onto the slice 1 output on line 198 and into the F memory 130 of slice 2. Since the portions of slice 1 in FIG. 6 which are connected to line 147 are not used where selector 199 is in the position shown in FIG. 7, such further elements are omitted from FIG. 7 for clarity.

F-Memory 130, which has previously been discussed in connection with FIG. 6, is provided with the convolution functions through logic 117 and line 189, with such functions being generated at computer 115. The convolution functions for successive integral values N are read out at line 137 from slice 2. The other element in the memory read-out, which provides the incremental difference between convolution functions for N and for N=1 via line 139 to multiplier 133, is in this instance nullified by providing a zero read-in through line 141 to multiplier 133. Thus the output from the multiplier line 134 is in turn zero. Hence, the output from adder 145 at line 147 is the function CF(N), this function entering slice 4 of the pipeline 113.

K memory 165, previously discussed in connection with FIG. 6, is provided during the convolution operation with the raw data from the detector element array, and the output from K memory 165, which receives its control and also raw data input via line 191 from logic 117 and computer 115, provides an output of DATA (K) via line 170 to multiplier 169. Multiplier 169 then forms the multiplications CF(N) x DATA(K) to yield the various terms for the convolution data functions forming part of equation (55) above. These functions are provided at slice 5 to the adder 173, with the output of same being furnished to M memory 177 in slice 6 which stores the final results CD(M).

The M memory 177 is seen to be in a loop with the adder 173 via the additional line 179, whereby the M memory serves again to accumulate the plurality of terms, which in accordance with equation (55) above constitutes the convolved data functions CD(M). This convolved data is then furnished to the computer 115, and as was previously discussed, utilized in connection with the back projection operations heretofore analyzed.

While the principles of the invention have now been made clear in the illustrated embodiment shown above, there will be obvious to those reasonably skilled in the art many modifications in arrangement of components and choices of variables used in the practice of the invention without departing from the above enunciated principles.

For example, other convolution functions than the one detailed herein may be employed. Further, it must be remembered that the technique of the invention can be employed over a wide range of applications, such as transmissive ultrasonics, electron microscopy, and others, as long as radiation in the shape of a fan beam can be caused to pass through an object at a plurality of angles and then detected.

The appended claims are intended to cover and embrace any such modification within the limits only of the true spirit of the invention.

I claim:

1. Apparatus for constructing a two-dimensional representation of an object lying in a quasi-plane comprising:
   a radiation source for providing radiation in the form of a fan beam positioned so that at least some of said radiation passes through said object;
   detector means positioned opposite said source and aligned therewith and lying in said quasi-plane for detecting radiation in said quasi-plane not absorbed or scattered by said object;

means for effecting relative rotation between said object and said source-detector means combination about an axis of rotation such that said source and detector means remain in said quasi-plane;

reconstruction means coupled to said detector means and comprising a general purpose computer, a special purpose computer, and control logic for interfacing between said computers and controlling the respective functioning thereof, for performing a convolution and back projection based upon said non-absorbed and non-scattered radiation detected by said detector means without first reordering said fan beam rays into a different set of rays, wherein said reconstruction means converts values of said non-absorbed and non-scattered radiation into values of absorbed radiation at each of an arbitrarily large number of points selected within said object; and display readout means coupled to said reconstruction means for providing a display of said amounts of absorbed radiation.

2. Apparatus in accordance with claim 1 wherein said special purpose computer comprises a pipeline processor.

3. Apparatus in accordance with claim 2 wherein said pipeline processor is operable in at least (a) a convolution mode of functioning wherein convolved data functions associated with said selected points of said object are computed and (b) a back projection mode of operation wherein mass densities are computed for said points; and wherein said convolution or back projection mode of operation is enabled by said control logic.

4. Apparatus in accordance with claim 3, wherein said pipeline processor includes first means for determining the back projection angle for said points selected within said object; second means downstream of said first means for providing a geometrically scaled function indicative of the convolved data function correlated with each said back projection angle determined at said first means; third means downstream of said second means, for scaling the functions from said second means to reflect the distance from said radiation source to said points, to thereby provide partial density functions for said points; and fourth means downstream of said third means for accumulating the said partial densities applicable for each of said points, to thereby yield the total appropriate densities for said points.

5. Apparatus in accordance with claim 4, wherein said second means includes memory means for storing said function indicative of said convolved data from prior calculations thereof incident to operation of said pipeline in said convolution mode.

6. Apparatus in accordance with claim 5, wherein said second means includes means for linearly interpolating between values stored in said memory means, to yield values for said functioning in addition to those stored.

7. Apparatus in accordance with claim 5, wherein said memory means during operation of said pipeline processor in said convolution mode, tabulates convolution functions provided from said general purpose computer, said pipeline processor including second memory means for storing data from said detector means; means for reading out said stored data and for operating thereupon by said tabulated convolution functions; and means for storing the resultant convolved data functions at the output of said pipeline for use in back projection.

8. Apparatus in accordance with claim 2, wherein said detector means comprises an elongate detector capable of measuring amounts of radiation at each point along said detector and converting said measurements into measurement signals.

9. Apparatus in accordance with claim 2 wherein said detector means comprises a plurality of detector elements.

10. A system for reconstructing into intelligible form data generated by fan beam radiation transmitted from a plurality of positions through an object to be inspected and onto detector means whereat a multiplicity of signals are received and detected; said system comprising:

means to perform a non-reordering convolution operation on manipulations of the signals received by said detector means at each position of the fan beam relative to said object to arrange said manipulations in convolved form representative of radiation transmitted through said object at each of said positions, and means for back projecting said convolved manipulations to form a two-dimensional reconstruction of the object;

said means being coupled to said detector means and including a general purpose computer, a special purpose computer, and control logic for interfacing between said computers and controlling the respective functioning thereof.

11. A system in accordance with claim 10 wherein said special purpose computer comprises a pipeline processor.

12. Apparatus in accordance with claim 11 wherein said pipeline processor is operable in at least (a) a convolution mode of functioning wherein convolved data functions associated with selected points of said object are computed and (b) a back projection mode of operation wherein mass densities are computed for said points and wherein said convolution or back projection mode of operation is enabled by said control logic.

* * * * *